(12) United States Patent
Yamashita et al.

(10) Patent No.: US 11,902,663 B2
(45) Date of Patent: Feb. 13, 2024

(54) ELECTRONIC DEVICES AND PROGRAM

(71) Applicant: NIKON CORPORATION, Tokyo (JP)

(72) Inventors: Naotaka Yamashita, Kawasaki (JP); Yuka Ono, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 156 days.

(21) Appl. No.: 17/263,242

(22) PCT Filed: Jul. 25, 2019

(86) PCT No.: PCT/JP2019/029222
§ 371 (c)(1),
(2) Date: Jan. 26, 2021

(87) PCT Pub. No.: WO2020/026939
PCT Pub. Date: Feb. 6, 2020

(65) Prior Publication Data
US 2021/0168298 A1    Jun. 3, 2021

(30) Foreign Application Priority Data

Jul. 31, 2018  (JP) ................................. 2018-144083

(51) Int. Cl.
*H04N 23/695*   (2023.01)
*H04N 23/51*    (2023.01)
*H04N 23/57*    (2023.01)

(52) U.S. Cl.
CPC .......... *H04N 23/695* (2023.01); *H04N 23/51* (2023.01); *H04N 23/57* (2023.01)

(58) Field of Classification Search
CPC ................ H04M 1/00; H04N 1/00132; H04N 1/00307; H04N 1/00973; H04N 1/2112; H04N 1/32122; H04N 2201/0084; H04N 2201/3253; H04N 23/51; H04N 23/57; H04N 23/66; H04N 23/695; H04N 5/77; H04N 7/18; H04N 9/8205
See application file for complete search history.

(56) References Cited

U.S. PATENT DOCUMENTS 9,185,062 B1 * 11/2015 Yang ..................... H04N 23/62
2008/0242223 A1  10/2008 Yamada
(Continued)

FOREIGN PATENT DOCUMENTS

JP   2008-252212 A   10/2008
JP   2011-077727 A    4/2011
(Continued)

OTHER PUBLICATIONS

Sep. 3, 2019 International Search Report issued in International Patent Application No. PCT/JP2019/029222.

*Primary Examiner* — Amy R Hsu
(74) *Attorney, Agent, or Firm* — Oliff PLC

(57) ABSTRACT

An electronic device is configured to send positional information to an external device configured to set the positional information to data, the electronic device includes: an acquisition unit configured to acquire positional information; and a sender unit configured to send information to the external device, wherein the sender unit is configured to send the external device a command not to set positional information received from the electronic device in a case where a mode not allowing the external device to set positional information to data is chosen.

23 Claims, 15 Drawing Sheets

(56) References Cited

U.S. PATENT DOCUMENTS

| | | | | |
|---|---|---|---|---|
| 2012/0050035 A1* | 3/2012 | Morii | ............... | G01S 19/34 |
| | | | | 340/539.13 |
| 2018/0114076 A1* | 4/2018 | Miller | ............... | H04N 23/667 |
| 2018/0176500 A1* | 6/2018 | Yokomitsu | ............... | B60R 25/305 |
| 2020/0186707 A1* | 6/2020 | Mallet | ............... | G06Q 50/18 |

FOREIGN PATENT DOCUMENTS

| | | |
|---|---|---|
| JP | 2012-054769 A | 3/2012 |
| JP | 2016-046596 A | 4/2016 |
| JP | 2017-034390 A | 2/2017 |

\* cited by examiner

ELECTRONIC DEVICES AND PROGRAM

CLAIM OF PRIORITY

The present application claims priority from Japanese patent application JP 2018-144083 filed on Jul. 31, 2018, the content of which is hereby incorporated by reference into this application.

BACKGROUND

This invention relates to electronic devices and a program therefor.

There is known an information communication system that transmits positional information (positional data) between a camera and a mobile phone (JP 2008-252212 A). Such an existing information communication system does not perform fine control to meet the device conditions.

SUMMARY

First aspect of the disclosure of an electronic device in this application is an electronic device configured to send positional information to an external device configured to set the positional information to data, the electronic device comprising: an acquisition unit configured to acquire positional information; and a sender unit configured to send information to the external device, wherein the sender unit is configured to send the external device a command not to set positional information received from the electronic device in a case where a mode not allowing the external device to set positional information to data is chosen.

Second aspect of the disclosure of an electronic device in this application is an electronic device configured to send positional information to an external device configured to set the positional information to data, the electronic device comprising: an acquisition unit configured to acquire positional information; and a sender unit configured to send information to the external device, wherein the sender unit is configured to send the external device invalid positional information in a case where a mode not allowing the external device to set positional information to data is chosen.

Third aspect of the disclosure of an electronic device in this application is an electronic device comprising: a generator unit configured to generate data; a receiver unit configured to receive information from an external device; a storage unit configured to store positional information sent by the external device and received by the receiver unit; and a control unit configured to set positional information to data generated by the generator unit, wherein the control unit is configured not to set positional information stored in the storage unit to data in a case where the receiver unit receives a command not to set positional information to data.

Fourth aspect of the disclosure of an electronic device in this application is an electronic device comprising: a generator unit configured to generate data; a receiver unit configured to receive information from an external device; a storage unit configured to store positional information sent from the external device and received by the receiver unit; and a control unit configured to set positional information to data generated by the generator unit, wherein the control unit is configured not to set positional information stored in the storage unit to data in a case where the receiver unit receives invalid positional information from the external device.

An aspect of the disclosure of a computer program in this application is a computer program configured to make a processor of an electronic device configured to send positional information to an external device configured to set positional information to data perform the processing of: acquiring positional information; and sending the external device a command not to set positional information received from the electronic device to data in a case where a mode not allowing the external device to set positional information to data is chosen.

Another aspect of the disclosure of a computer program in this application is a computer program configured to make a processor of an electronic device configured to send positional information to an external device configured to set positional information to data perform the processing of: acquiring positional information; and sending invalid positional information to the external device in a case where a mode not allowing the external device to set positional information to data is chosen.

DETAILED DESCRIPTION OF THE EMBODIMENTS

Hereinafter, electronic devices and a program according to the embodiments of this invention are described with reference to the accompanying drawings. The following embodiments are described employing a smartphone as an example of an electronic device and a digital camera (imaging device) as an external electronic device (hereinafter, external device) capable of communicating with the electronic device. The electronic device is not limited to a smartphone but can be a portable device or an autonomous movable device, as far as it is capable of communicating with an external device and acquiring its positional information. Examples of the portable device include a mobile phone, a gaming machine, and a tablet computer and examples of the autonomous movable device includes a drone and a robot.

The external device is not limited to a digital camera but can be a digital video camera, a gaming machine, a tablet computer, a drone, or a robot, as far as it is capable of communicating with the electronic device and generating data to be associated with positional information sent from the electronic device. The external device has to be a device that is incapable of generating positional information by itself or can choose not to acquire its positional information even though it is capable of acquiring its positional information like the electronic device.

Embodiment 1

Examples of Setting and Canceling Positional Information

Figure 1:
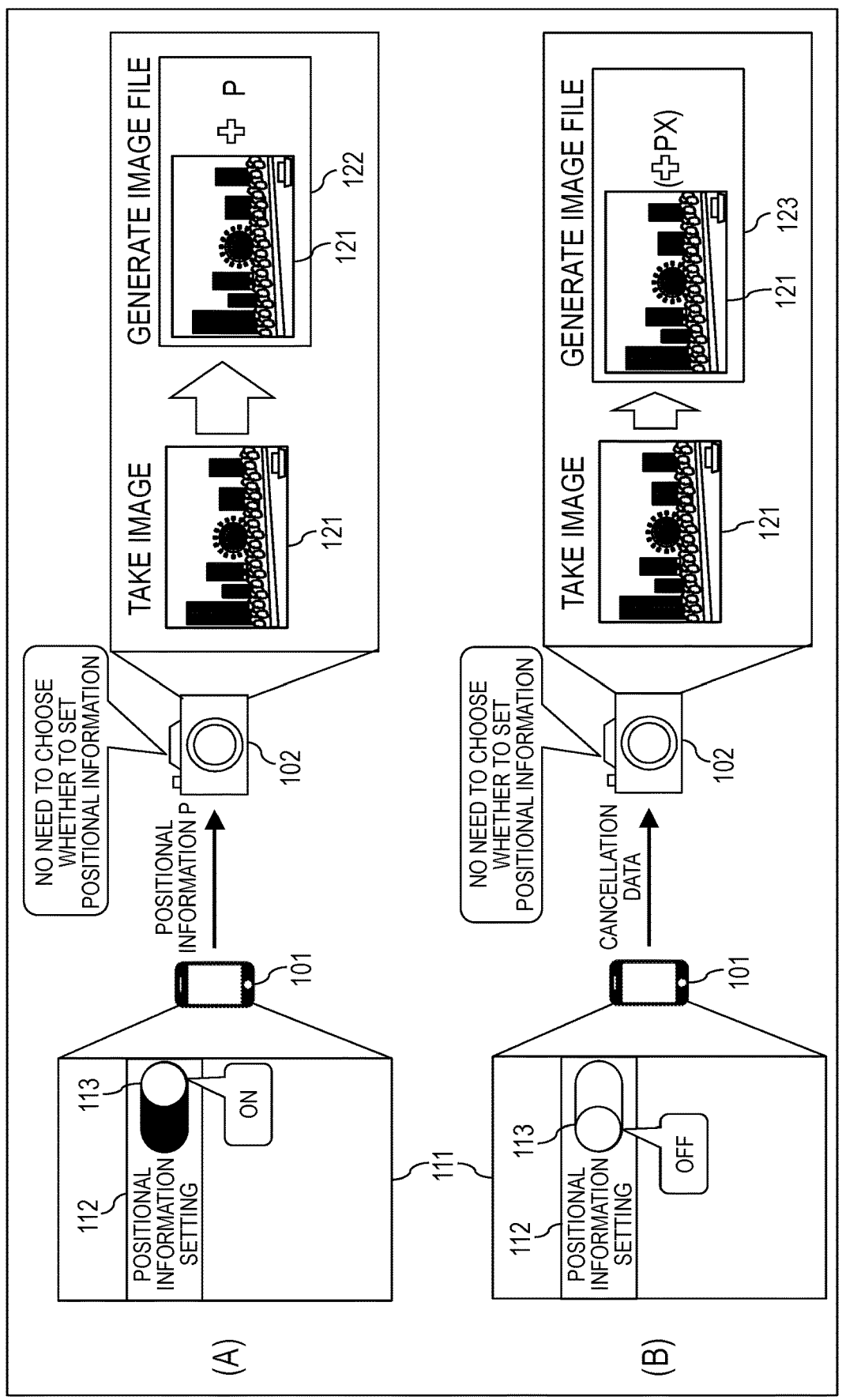
FIG. 1 is an explanatory diagram illustrating an example of setting positional information and an example of canceling the positional information.

FIG. 1 is an explanatory diagram illustrating an example of setting positional information and an example of canceling the positional information. The example (A) illustrates that a smartphone 101 makes a digital camera 102 set positional information P and the example (B) illustrates that the smartphone 101 makes the digital camera 102 cancel the positional information. The user takes an image of an object with the digital camera 102 while carrying the smartphone 101. The positional information P is information for identifying the position of the smartphone 101 with a latitude and a longitude, for example.

The configuration screen 111 includes a slider 113 in a positional information setting mode field 112. The slider 113 is an interface that slides horizontally in accordance with user operation. When the slider 113 is located at the right end, it means positional information is to be set (ON). When the slider is located at the left end, it means positional information is not to be set (OFF). The digital camera 102 does not have a function to choose whether to set positional information P.

In the example (A), the positional information setting mode of the smartphone 101 is ON. Accordingly, the smartphone 101 successively acquires positional information P by satellite positioning, for example, and sends it to the digital camera 102. The digital camera 102 stacks the successively received positional information P in a cache memory. The digital camera 102 takes an image of an object and generates image data 121 of the object.

The digital camera 102 retrieves the latest positional information P from the cache memory and sets the retrieved positional information P to the image data 121 to generate an image file 122. The positional information P can be stored to the image file 122 in the form of exchangeable image file (Exif) information. Hence, the digital camera 102 can associate the positional information P on the place where the image data 121 is generated with the image data 121 even though the digital camera 102 does not have a satellite positioning function.

In the example (B), the smartphone 101 is in a state where the positional information setting mode is changed from ON to OFF. In this state, the smartphone 101 does not send positional information P but instead, sends cancellation data to cancel the positional information P already sent to the digital camera 102.

The cancellation data can be a command to discard the positional information P. Upon receipt of the command to discard the positional information P, the digital camera 102 clears its cache memory. The digital camera 102 takes an image of an object to generate image data 121. The digital camera 102 tries to retrieve the latest positional information P from the cache memory but cannot because the cache memory is cleared. Accordingly, the digital camera 102 generates an image file 123 without setting positional information P to the image data 121. When the mode not to set positional information P is chosen in the smartphone 101, positional information P is not set to image data 121.

This configuration enables choosing to set or not to set positional information P to image data 121 generated by the digital camera 102 with the smartphone 101 only. In other words, choosing whether to set positional information P with the digital camera 102 becomes unnecessary; the digital camera 102 does not require complicated user operation, increasing the convenience for the user.

The foregoing description employs a command to discard positional information P as an example of cancellation data to clear the cache memory in which positional information P is stacked; however, the cancellation data is not limited to this example. For example, the smartphone 101 can send invalid positional information PX as another example of cancellation data to the digital camera 102 so that the digital camera 102 stores the invalid positional information PX to the cache memory.

The invalid positional information PX can be impossible values of latitude and longitude. As a result, the digital camera 102 retrieves the invalid positional information PX from the cache memory as the latest positional information and sets the retrieved invalid positional information PX to the image data 121 to generate an image file 123.

Examples of Information Stored in Cache Memory

Figure 2:
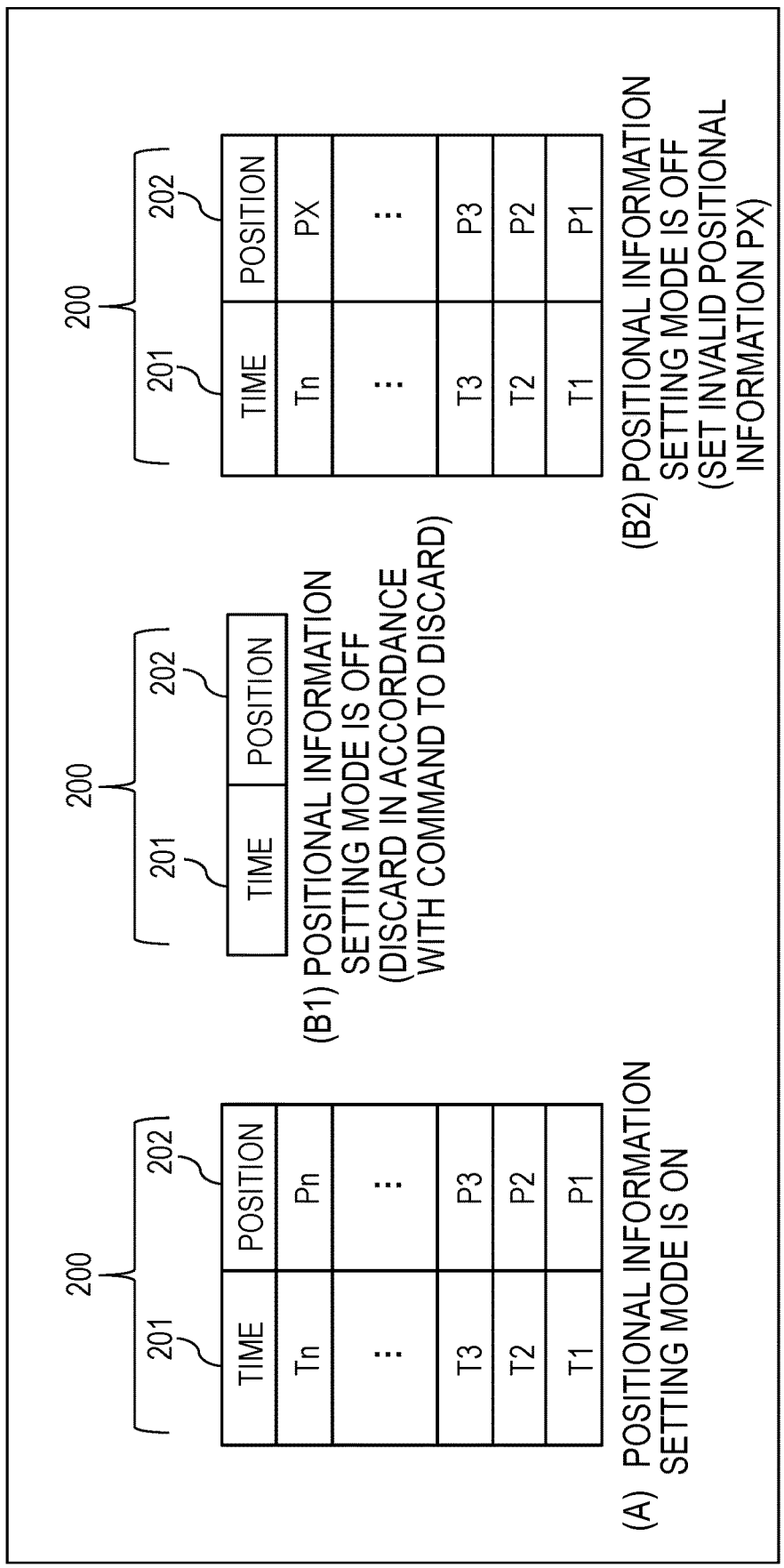
FIG. 2 is an explanatory diagram providing examples of information stored in the cache memory of the digital camera.

FIG. 2 is an explanatory diagram providing examples of information stored in the cache memory of the digital camera 102. The example (A) illustrates an example of information stored in the cache memory 200 of the digital camera 102 when the positional information setting mode is ON, like the example (A) in FIG. 1. The examples (B1) and (B2) illustrate examples of information stored in the cache memory 200 of the digital camera 102 when the positional information setting mode is switched from ON to OFF, like the example (B) in FIG. 1.

The digital camera 102 associates a position 202 with a time 201 and stores them as a record to the cache memory 200. The position 202 is the position of the smartphone 101 at the time 201. Since the user in this example carries the smartphone 101 and the digital camera 102, the position 202 corresponds to the position of the digital camera 102.

As to the example (A), the smartphone 101 sends the values T1 to Tn (n is an integer greater than 1) for the time 201 together with positions 202 indicated by positional information P to the digital camera 102. In this example, a smaller value for n represents an older value; the time T1 and the position P1 when n=1 are the oldest values.

The time 201 can be a time at which the smartphone 101 acquires positional information by satellite positioning or a time at which the smartphone 101 sends out the positional information P to the digital camera 102. As a result, accurate positional information P of the smartphone 101 at acquisition of the positional information can be set to data generated by the digital camera 102 at acquisition of the positional information. In the example where the smartphone 101 does not send the time 201, the time 201 can be a time at which the digital camera 102 receives positional information P. This configuration reduces the amount of data to be transmitted from the smartphone 101.

The example (B1) illustrates an example of information stored in the cache memory 200 after the positional information P is discarded in accordance with a command to discard positional information P as cancellation data. Upon receipt of the command to discard positional information P from the smartphone 101, the digital camera 102 discards the times 201 and the positions 202.

The example (B2) illustrates an example of information stored in the cache memory 200 after invalid positional information PX as cancellation data is recorded. Upon receipt of the invalid positional information PX from the smartphone 101, the digital camera 102 records the time of reception Tn as a time 201 and the invalid positional information PX as a position 202.

The digital camera 102 retrieves the position 202 in the cache memory 200 every time no matter whether the mode to set positional information P is ON or OFF in the smartphone 101. Accordingly, if the cache memory 200 is in the state of example (A), the digital camera 102 retrieves the positional information Pn; if in the state of example (B1), the digital camera 102 retrieves nothing; and if in the state of example (B2), the digital camera 102 retrieves the invalid positional information PX. This configuration eliminates the necessity to choose whether to set positional information P with the digital camera 102, increasing the user-friendliness of the digital camera 102.

Example of Hardware Configuration of Smartphone 101

Figure 3:
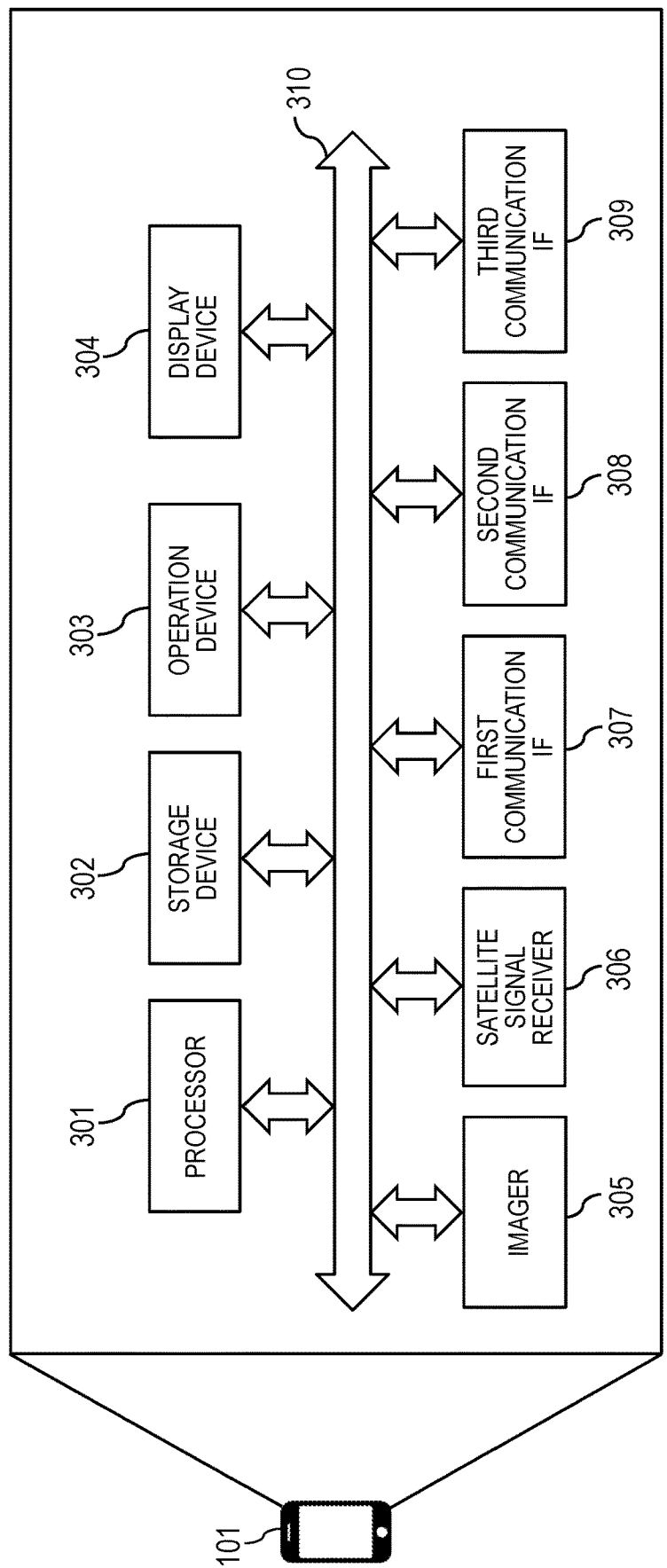
FIG. 3 is a block diagram illustrating an example of the hardware configuration of the smartphone.

FIG. 3 is a block diagram illustrating an example of the hardware configuration of the smartphone 101. The smartphone 101 includes a processor 301, a storage device 302, an operation device 303, a display device 304, an imager 305, a satellite signal receiver 306, a first communication interface (IF) 307, a second communication IF 308, and a third communication IF 309. These are connected by a bus 310 to be able to communicate with one another.

The processor 301 controls the smartphone 101. The processor 301 executes programs. The processor 301 generates positional information P based on a received satellite signal, for example. The storage device 302 serves as a working area for the processor 301. The storage device 302 is a non-transitory or transitory recording medium for storing programs and data. Examples of the storage device 302 include a read only memory (ROM), a random access memory (RAM), a hard disk drive (HDD), and a flash memory.

The operation device 303 receives input of data. Examples of the operation device 303 include a button and a touch panel. The display device 304 displays information on a display screen. The display device 304 displays the configuration screen 111. The imager 305 includes a lens and an image sensor for taking an image of an object and outputting an image signal. The satellite signal receiver 306 receives a satellite signal transmitted from a positioning satellite.

The first communication IF 307 is a communication module connectable to the Internet through a router for a wireless local area network (LAN), such as a Wi-Fi module. In the case where the digital camera 102 functions as a software-based access point like in the case of ad hoc Wi-Fi connection, the first communication IF 307 is connected with the digital camera 102.

The second communication IF 308 is a communication module for lower-speed communication than the first communication IF 307, for example for Bluetooth™ Low Energy (BLE) ("™" will be omitted hereinafter). The third communication IF 309 is a communication module connectable to the Internet via a wireless base station, such as a 4G module or a Long-Term Evolution (LTE) module.

Example of Hardware Configuration of Digital Camera 102

Figure 4:
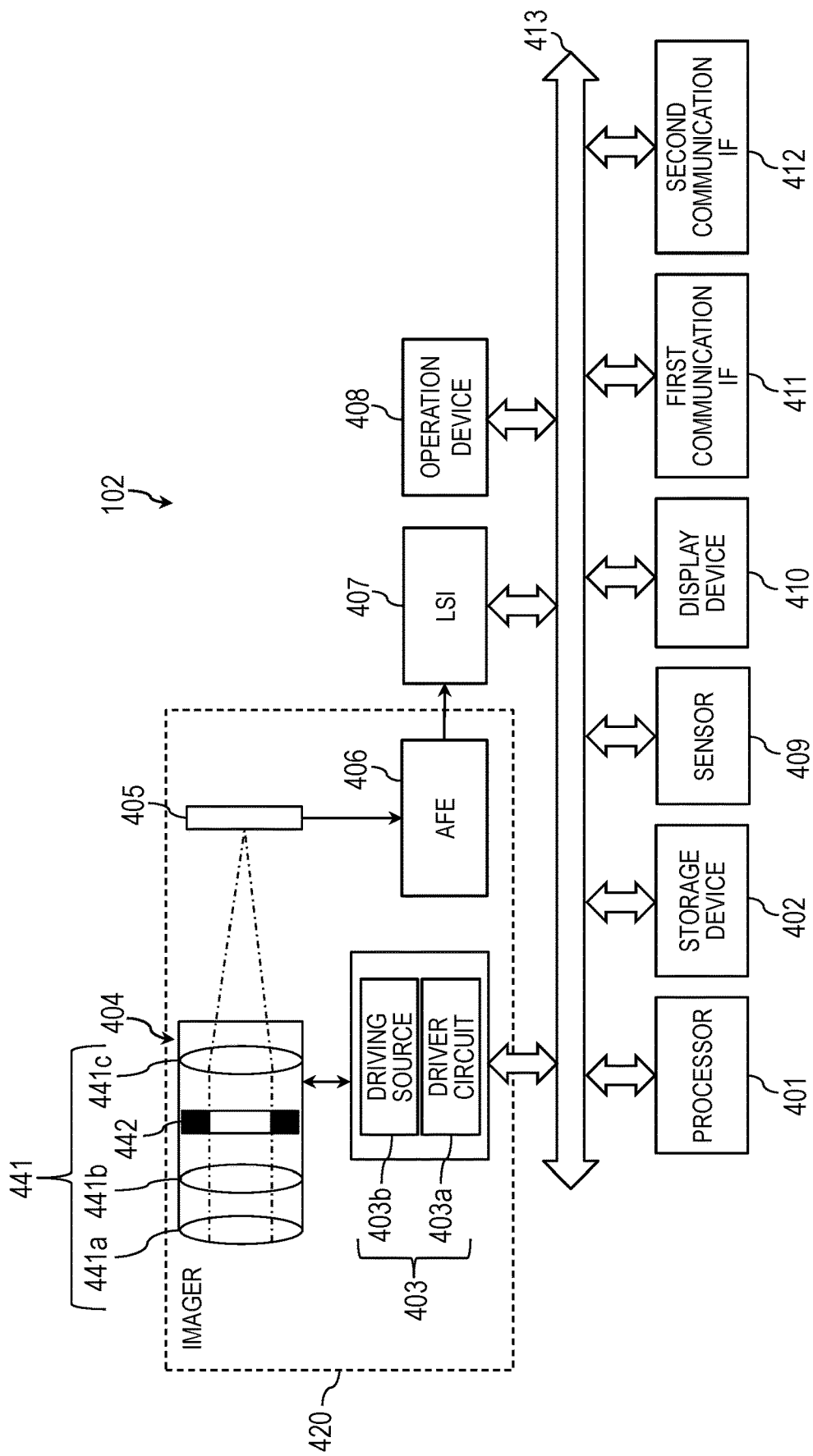
FIG. 4 is a block diagram illustrating an example of the hardware configuration of the digital camera.

FIG. 4 is a block diagram illustrating an example of the hardware configuration of the digital camera 102. The digital camera 102 is an imaging device that can take a still image and a motion video.

The digital camera 102 includes a processor 401, a storage device 402, a driver 403, an optical system 404, an image sensor 405, an analog front-end (AFE) 406, a large-scale integration (LSI) 407, an operation device 408, a sensor 409, a display device 410, a first communication IF 411, a second communication IF 412, and a bus 413. The processor 401, the storage device 402, the driver 403, the LSI 407, the operation device 408, the sensor 409, the display device 410, the first communication IF 411, and the second communication IF 412 are connected with the bus 413.

The processor 401 controls the digital camera 102. The processor 401 executes programs. The storage device 402 serves as a working area for the processor 401. The storage device 402 is a non-transitory or transitory recording medium for storing programs and data. Examples of the storage device 402 include a ROM, a RAM, an HDD, and a flash memory. The cache memory 200 illustrated in FIG. 2 is included in the storage device 402. The digital camera 102 can include a plurality of storage devices 402 and at least one of them can be removable from the digital camera 102.

The driver 403 drives and controls the optical system 404. The driver 403 includes a driver circuit 403a and a driving source 403b. The driver circuit 403a controls the driving source 403b in accordance with instructions from the processor 401. The driving source 403b can be a motor; it moves a zooming lens 441b and a focusing lens 441c in the optical system 404 along the optical axis and also, opens and closes a diaphragm 442 in accordance with control of the driver circuit 403a.

The optical system 404 includes a plurality of lenses (a lens 441a, a zooming lens 441b, and a focusing lens 441c) disposed along the optical axis, and a diaphragm 442. The optical system 404 collects light from an object and emits the light to the image sensor 405.

The image sensor 405 receives the object light from the optical system 404 and converts it to electric signals. The image sensor 405 can be a solid-state image sensor employing an X-Y address method (for example a complementary metal-oxide semiconductor (CMOS) sensor) or a solid-state image sensor employing a progressive scanning method (for example, a charge coupled device (CCD)).

The image sensor 405 has a plurality of photosensitive elements (pixels) arrayed in a matrix on its light-receiving surface. Each pixel of the image sensor 405 is provided with one of a plurality of kinds of color filters disposed in a specific color arrangement (for example, Bayer arrangement) so that the pixel transmits a specific color component. Accordingly, each pixel of the image sensor 405 outputs an analog electric signal corresponding to a color component obtained by color separation with the color filter.

The AFE 406 is an analog front-end circuit for processing analog electric signals from the image sensor 405. The AFE 406 performs gain adjustment for the electric signals, analog signal processing (such as correlated double sampling and black level correction), A/D conversion, digital signal processing (such as defective pixel correction) one after another to generate raw image data and outputs the row image data to the LSI 407. The above-described driver 403, the optical system 404, the image sensor 405, and the AFE 406 are included in an imager 420.

The LSI 407 is an integrated circuit for specific processing including image processing such as color interpolation, white balance adjustment, contour enhancement, gamma correction, and grayscale conversion, encoding, decoding, and compressing/decompressing on the raw image data received from the AFE 407. Specifically, the LSI 407 can be a programmable logic device (PLD) such as an application-specific integrated circuit (ASIC) or a field-programmable gate array (FPGA).

The operation device 408 inputs commands and data. Examples of the operation device 408 include various kinds of buttons including a release button, a switch, a dial, and a touch panel. The sensor 409 is a device for detecting information. Examples of the sensor 409 include an automatic focus (AF) sensor, an automatic exposure (AE) sensor, a gyro sensor, an acceleration sensor, and a temperature sensor. The display device 140 displays image data 121 and a configuration screen. Examples of the display device 140 include a backside monitor provided on the backside of the digital camera 102 and an electronic viewfinder.

The first communication IF 411 is a communication module that can communicate with the smartphone 101 by ad hoc Wi-Fi connection, for example. The second communication IF 412 is a communication module for lower-speed communication than the first communication IF 411, such as a BLE module.

Example of Functional Configuration of Communication System

Figure 5:
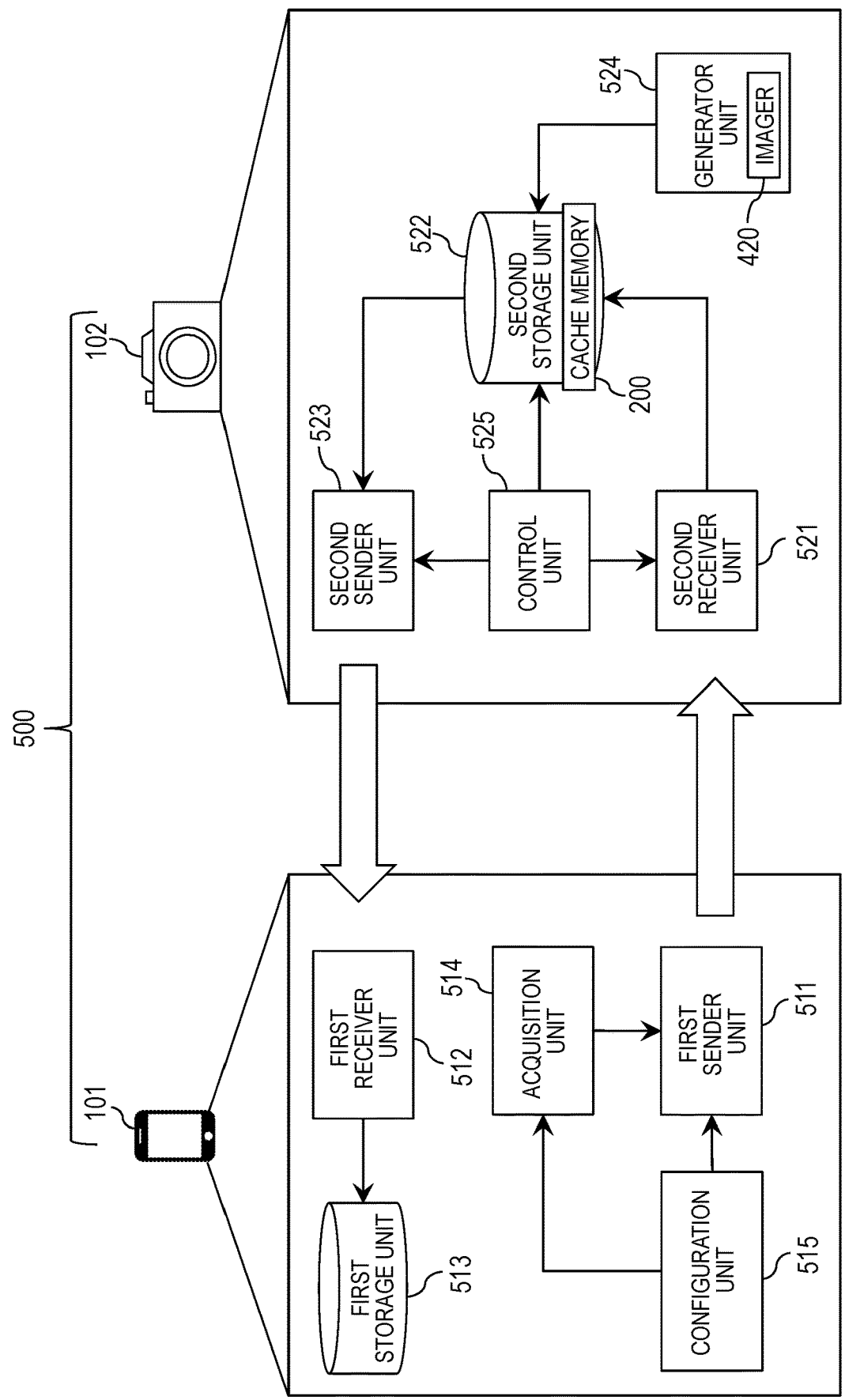
FIG. 5 is a block diagram illustrating an example of the functional configuration of a communication system.

FIG. 5 is a block diagram illustrating an example of the functional configuration of a communication system. The communication system 500 consists of a smartphone 101 and a digital camera 102. The configuration of the smartphone 101 is described first.

Configuration Example of Smartphone 101

The smartphone 101 includes a first sender unit 511, a first receiver unit 512, a first storage unit 513, an acquisition unit 514, and a configuration unit 515. The first sender unit 511 sends positional information P or cancellation data to the digital camera 102. Specifically, the first sender unit 511 sends positional information P or cancellation data to the digital camera 102 through BLE or ad hoc Wi-Fi connection.

Transmission by BLE saves power consumption. Transmission by ad hoc Wi-Fi connection enables high-speed direct data transfer to the digital camera 102. The first sender unit 511 may send the time of acquisition or the time of sending of the positional information P to the digital camera 102. Specifically, the first sender unit 511 can be implemented by the first communication IF 307 or the second communication IF 308 illustrated in FIG. 3.

The first receiver unit 512 receives data from the digital camera 102. The data from the digital camera 102 can be an image file or a motion video file generated by the digital camera 102. Specifically, the first receiver unit 512 receives data from the digital camera 102 through ad hoc Wi-Fi connection. The ad hoc Wi-Fi connection enables direct reception of large data from the digital camera 102. Specifically, the first receiver unit 512 can be implemented by the first communication IF 307 illustrated in FIG. 3.

The first storage unit 513 stores data received by the first receiver unit 512. Specifically, the first storage unit 513 can be implemented by the storage device 302 illustrated in FIG. 3.

The acquisition unit 514 acquires positional information P. Specifically, the acquisition unit 514 acquires a latitude and a longitude as positional information P by determining the latitude and the longitude from satellite signals from four positioning satellites received by the satellite signal receiver 306. Each time the acquisition unit 514 acquires positional information P, the positional information P is sent from the first sender unit 511. Specifically, the acquisition unit 514 can be implemented by the processor 301 executing a program stored in the storage device 302.

The configuration unit 515 activates either a mode (first mode) to set positional information P to the data generated by the digital camera 102 or mode (second mode) not to set positional information P. Specifically, the configuration unit 515 activates the first mode, or turns on the positional information setting mode in response to the slider 113 being slid to the right end as shown in the example (A) in FIG. 1 and activates the second mode, or turns off the positional information setting mode in response to the slider 113 being slid to the left end as shown in the example (B) in FIG. 1.

Under the first mode (when the positional information setting mode is ON), the acquisition unit 514 repeatedly acquires positional information P and the first sender unit 511 successively sends the positional information P acquired by the acquisition unit 514 to the digital camera 102. Under the second mode (when the positional information setting mode is OFF), the configuration unit 515 sets cancellation data to the first sender unit 511 and the first sender unit 511 sends the cancellation data to the digital camera 102.

When communication with the digital camera 102 is not available under the first mode (when the positional information setting mode is ON), the configuration unit 515 changes the first mode to the second mode (turns the positional information setting mode from ON to OFF). "Communication is not available" means that connection to the digital camera 102 has not been established or that the connection to the digital camera 102 is disconnected because of communication failure. As a result of this operation, the first sender unit 511 does not send positional information P when communication is unavailable.

When communication becomes available later, the configuration unit 515 changes the second mode to the first mode (turns the positional information setting mode from OFF to ON). As a result of this operation, the acquisition unit 514 restarts repeatedly acquiring positional information P and the first sender unit 511 successively sends the positional information P acquired by the acquisition unit 514 to the digital camera 102.

When communication with the digital camera 102 is not available, the smartphone 101 may notify the user of it by sound or image. As a result, the user is informed of the automatic change from the first mode to the second mode (that the positional information setting mode is automatically turned from ON to OFF).

When communication with the digital camera 102 is not available, the configuration unit 515 may disable the user operation to choose the first mode or the second mode. Specifically, the smartphone 101 does not display the positional information setting mode field 112 in the configuration screen 111 in FIG. 1 or makes the slider 113 inoperative although the smartphone 101 displays the configuration screen 111.

Not displaying the positional information setting mode field 112 prevents the user from reflecting his/her intention to set positional information when communication is unavailable. Disabling the operation of the slider 113 prevents the user from reflecting his/her intention to set positional information when communication is unavailable and further, allows the user to know whether the current mode is the first mode (the positional information setting mode: ON) or the second mode (the positional information setting mode: OFF).

The configuration unit 515 can disable the user operation to choose the first mode (the positional information setting mode: ON) or the second mode (the positional information setting mode: OFF) and change the mode from the first mode (the positional information setting mode: ON) to the second mode (the positional information setting mode: OFF) when connected communication with the digital camera 102 is disconnected because of communication failure or the communication is terminated. This configuration saves the power consumption by sending positional information P against the user's intention after the smartphone 101 and the digital camera 102 are reconnected. Specifically, the configuration unit 515 is implemented by the processor 301 executing a program stored in the storage device 302.

Configuration Example of Digital Camera 102

The digital camera 102 includes a second receiver unit 521, a second storage unit 522, a second sender unit 523, a generator unit 524, and a control unit 525. The second receiver unit 521 receives information from the smartphone 101. The information from the smartphone 101 can be positional information acquired by the smartphone 101 or cancellation data (a command to discard positional information P or invalid positional information PX) set by the smartphone 101. Specifically, the second receiver unit 521 receives information from the smartphone 101 through BLE or ad hoc Wi-Fi connection. Specifically, the second receiver unit 521 can be implemented by the first communication IF 411 or the second communication IF 412 illustrated in FIG. 4.

The second storage unit 522 stores information received by the second receiver unit 521. Specifically, the second storage unit 522 stores positional information P and times of acquisition of the positional information P as positions 202 and times 201 as illustrated in FIG. 2. The second storage unit 522 further stores data generated by the generator unit 524. Specifically, the second storage unit can be implemented by the storage device 402 illustrated in FIG. 4.

The second sender unit 523 sends information stored in the second storage unit 522 to the smartphone 101. Specifically, the second sender unit 523 sends data generated by the generator unit 524 and stored in the second storage unit 522, for example. More specifically, the second sender unit 523 sends image files 122, 123, and motion video files stored in the second storage unit 522 to the smartphone 101 through ad hoc Wi-Fi connection. Transmission by ad hoc Wi-Fi connection enables high-speed direct transfer of large data. Specifically, the second sender unit 523 can be implemented by the first communication IF 411 illustrated in FIG. 4.

The generator unit 524 generates data. Specifically, the generator unit 524 includes an imager 420 and generates image data 121 based on an image signal from the imager 420. Further, the generator unit 524 generates an image file 122 or 123 from the image data 121 or generates a motion video file by sorting a series of image data 121 in time series.

The control unit 525 controls the cache memory 200. Specifically, the control unit 525 stores positional information P to the top of the stack in the cache memory 200 as illustrated in the example (A) in FIG. 2 when the second receiver unit 521 receives the positional information P. This configuration makes the control unit 525 retrieve the last stored positional information P.

In the case where the second receiver unit 521 receives the time of acquisition together, the control unit 525 also stores the time of acquisition with the positional information P to the cache memory 200. As a result of this operation, the control unit 525 retrieves the last stored time of acquisition together with the positional information P. The control unit 525 may accumulate a certain number of records (combinations of a time 201 and a position 202) in the cache memory 200 and delete them one by one from the oldest record when the number of records exceeds the certain number. This configuration allows the cache memory 200 to have a limited capacity.

The control unit 525 deletes positional information P from the cache memory 200 when a certain time (for example, two hours) has elapsed since the positional information P is stored. Specifically, the control unit 525 deletes the record of a position 202 that has been in the cache memory 200 for the certain time since the time 201.

When a long time has elapsed since a position 202 is stored, it is considered that the user is no longer at the position 202. However, the user may leave the digital camera 102 while carrying the smartphone 101, so that the communication between the smartphone 101 and the digital camera 102 could be disconnected. In this case, if the user returns to the digital camera 102 within a certain period, the smartphone 101 and the digital camera 102 will be reconnected. Accordingly, in consideration of the user's convenience, it is preferable that the digital camera 102 hold the positional information P in the cache memory 200 for a certain period before deleting it from the cache memory 200.

Furthermore, the control unit 525 retrieves the positional information P stored last in the cache memory 200 and sets the positional information P to data generated by the generator unit 524 when the data is stored to the second storage unit 522. Specifically, the control unit 525 sets the positional information P to the generated image data 121 to generate an image file 122 as illustrated in the example (A) in FIG. 1.

This configuration enables positional information P to be associated with image data 121 even if the digital camera 102 does not include a satellite signal receiver 306 like the smartphone 101. Accordingly, where the image data 121 is taken can be located by referring to the image file 122.

In the case where the second receiver unit 521 receives cancellation data, the control unit 525 controls the cache memory 200 depending on the kind of the cancellation data. Specifically, in the case where the cancellation data is a command to discard positional information P, the control unit 525 clears the cache memory 200 as illustrated in the example (B1) in FIG. 2.

After this operation, the control unit 525 cannot retrieve positional information P when the control unit 525 accesses the cache memory 200, because the cache memory 200 does not include any record. Accordingly, data from the generator unit 524 will not be provided with positional information P even if the digital camera 102 does not have a mode not to set positional information P.

In the case where the cancellation data is invalid positional information PX, the control unit 525 stores invalid positional information PX to the top of the stack in the cache memory 200 as illustrated in the example (B2) in FIG. 2. After this operation, the control unit 525 retrieves the invalid positional information PX when the control unit 525 accesses the cache memory 200.

Accordingly, even if the digital camera 102 does not have a mode not to set positional information P, data from the generator unit 524 will be provided with invalid positional information PX. Since this invalid positional information PX indicates a position that does not exist actually, the data with the invalid positional information PX will not be recognized erroneously as data generated at a position indicated by the positional information P.

In addition, the control unit 525 may discard positional information stored in the cache memory 200 in the second storage unit 522 if the second receiver unit 521 cannot receive information from the smartphone 101. Specifically, when established BLE connection with the smartphone 101 is disconnected because of communication failure or the smartphone 101 leaving the communication range, for example, the control unit 525 discards the positional information P accumulated in the cache memory 200.

As a result of this operation, image data 121 generated during the disconnection is not provided with positional information. The smartphone 101 and the digital camera 102 could be at different positions during the disconnection and accordingly, discarding the positional information P in response to disconnection prevents wrong positional information P from being set. After reconnection, the cache memory 200 stores the latest positional information P newly received from the smartphone 101 and therefore, setting positional information P to image data 121 becomes available.

Example of Connection Sequence in Communication System 500

Figure 6:
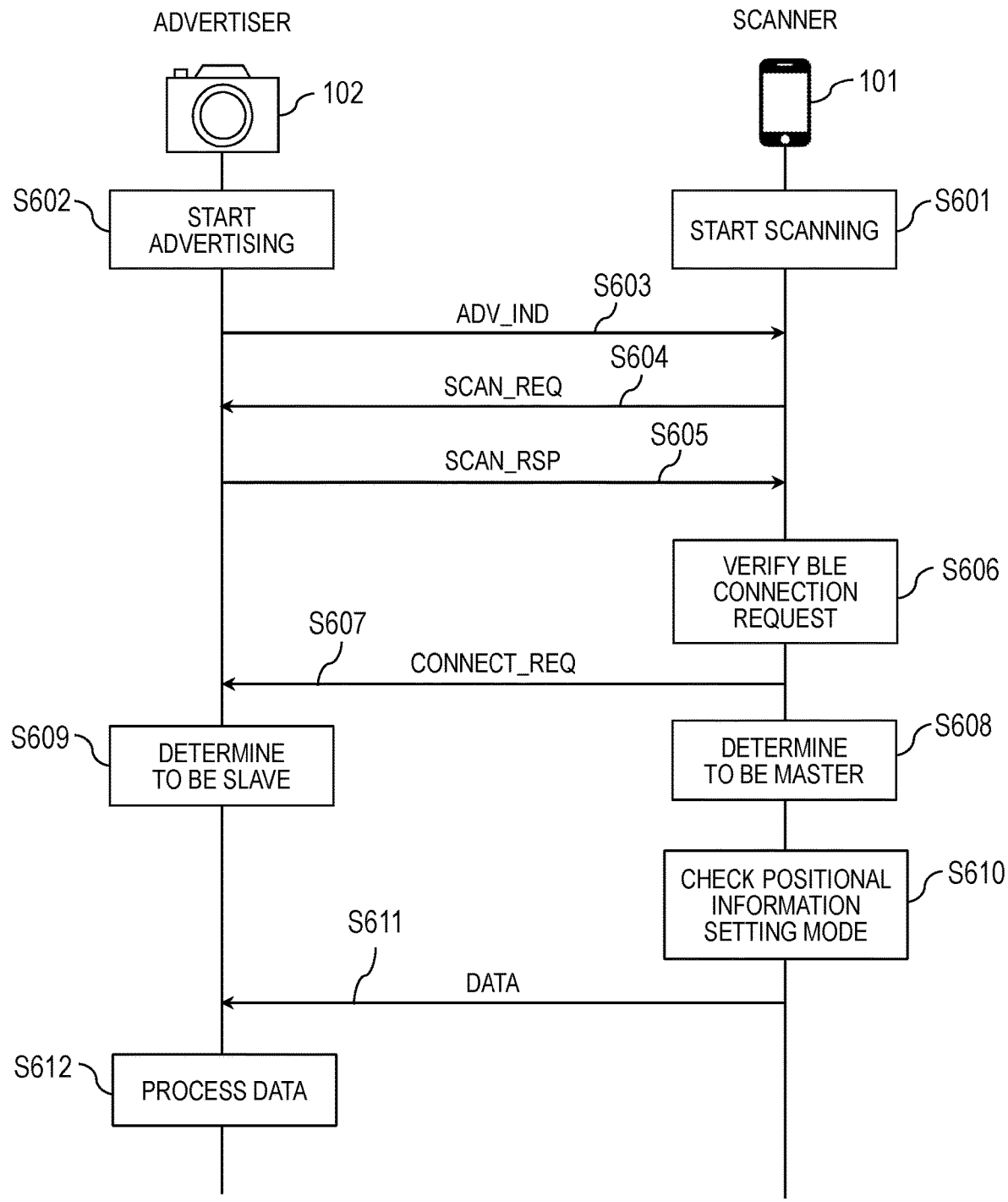
FIG. 6 is a sequence diagram illustrating an example of a connection sequence in the communication system.

FIG. 6 is a sequence diagram illustrating an example of a connection sequence in the communication system 500. FIG. 6 illustrates an example of a sequence to connect the digital camera 102 and the smartphone 101 by BLE to be able to communicate with each other. In FIG. 6, the digital camera 102 is an advertiser (also referred to as broadcaster) that broadcasts an advertisement packet and the smartphone 101 is a scanner (also referred to as observer) that scans for the advertisement packet.

The smartphone 101 starts scanning for an advertisement packet in accordance with presetting or in response to an operation input from the user (Step S601). The digital camera 102 starts advertising in accordance with presetting or in response to an operation input from the user (Step S602). Hence, the digital camera 102 repetitively broadcasts an advertisement packet ADV_IND indicating that the digital camera 102 is connectable デジタルカメラ 1 0 2 with constant intervals (Step S602). The advertisement packet ADV_IND includes identification information specifying that the digital camera 102 requests positional information P.

In the case of active scanning, the smartphone 101 that has received the advertisement packet ADV_IND sends a scanning request SCAN_REQ to the digital camera 102 (Step S604) and the digital camera 102 that has received the scanning request SCAN_REQ returns a scanning response SCAN_RSP to the smartphone 101 (Step S605).

In the case of passive scanning, Steps S604 and S605 are not performed. In the passive scanning, the digital camera 102 broadcasts an advertisement packet ADV_DIRECT_IND specifying that the digital camera 102 is connectable and does not allow scanning at Step S603.

Subsequently, the smartphone 101 verifies the BLE connection request (Step S606). Specifically, the smartphone 101 checks whether the received advertisement packet ADV_IND includes identification information specifying that the digital camera 102 requests positional information P. If the advertisement packet ADV_IND includes such identification information, the smartphone 101 sends a connection request CONNECT_REQ to the source of the advertisement packet ADV_IND, or the digital camera 102 (Step S607).

The smartphone 101 determines that the smartphone 101 itself is a master (Step S608) and the digital camera 102 that has received the connection request CONNECT_REQ determines that the digital camera 102 itself is a slave (Step S609). Through these operations, BLE connection is established between the smartphone 101 and the digital camera 102.

Subsequently, the smartphone 101 checks the positional information setting mode (Step S610). Specifically, if the positional information setting mode is ON, the smartphone 101 can acquire positional information P and send it to the slave (digital camera 102); if the positional information setting mode is OFF, the smartphone 101 can send cancellation data to the slave (digital camera 102).

The smartphone 101 sends data (positional information P or cancellation data) to the digital camera 102 of the slave in accordance with the result of checking the positional information setting mode at Step S610 (Step S611). The digital camera 102 performs data processing as illustrated in FIG. 1 based on the received data (Step S612). An example of a detailed procedure of data processing (Step S612) will be described later with FIG. 8.

Example of Scanning and Connecting by Smartphone 101

Figure 7:
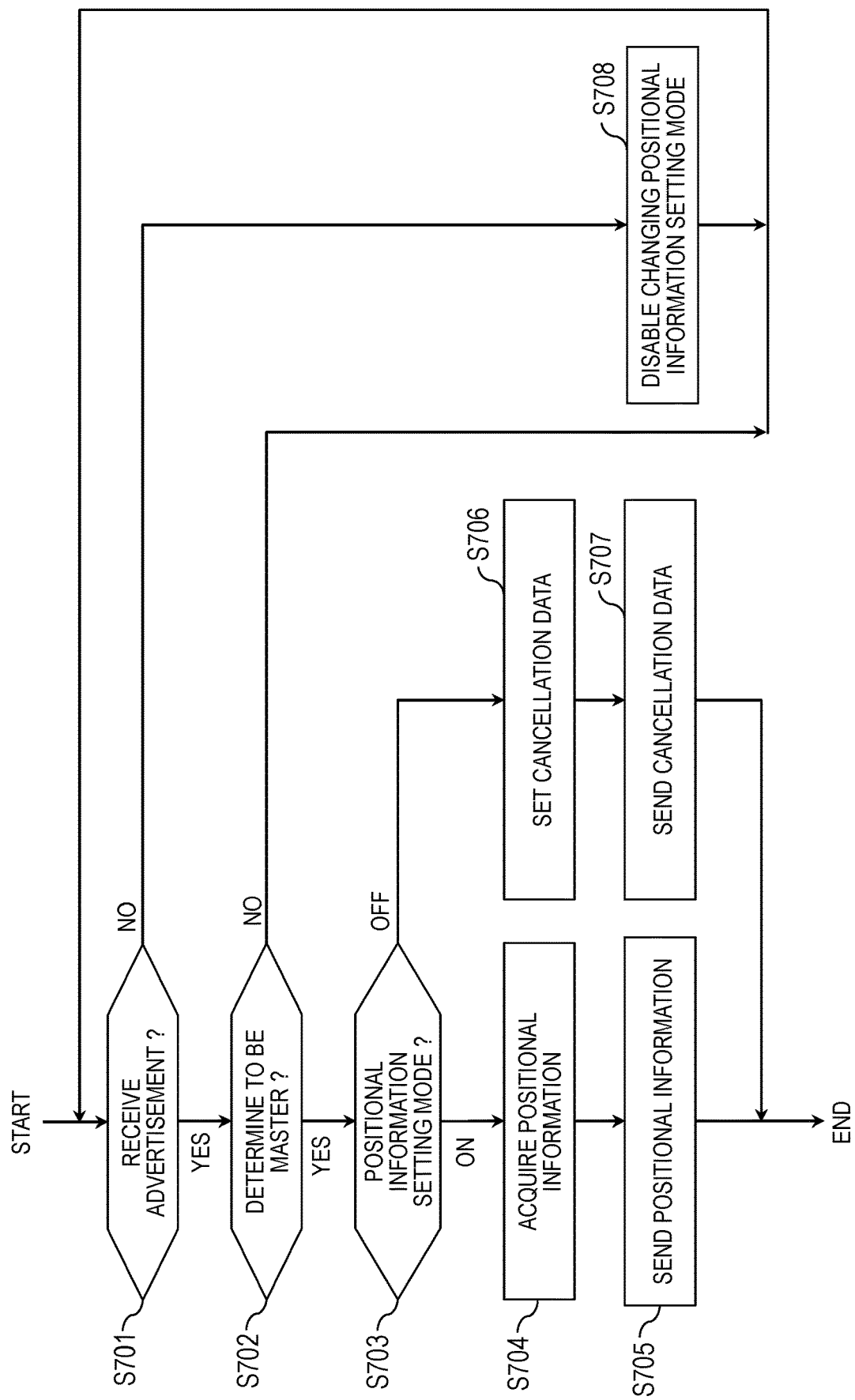
FIG. 7 is a flowchart of an example of scanning and connecting by the smartphone.

FIG. 7 is a flowchart of an example of scanning and connecting by the smartphone 101. The flowchart of FIG. 7 is an example of processing of an application program to be executed by the processor 301 when scanning is started at Step S601 in FIG. 6. The processor of the smartphone 101 can execute this application program in the background or the foreground. In the case of the foreground, this application program has to be explicitly started. Further in the case of the foreground, the positional information setting mode can be manually changed between ON and OFF.

If the smartphone 101 receives an advertisement packet at Step S603 (Step S701: Yes) and determines to be a master (Step S702: Yes), connection with the digital camera 102 is established. In this case, the smartphone 101 checks whether the mode to set positional information P is ON or OFF (Step S703).

If the positional information setting mode is ON (Step S703: ON), the smartphone 101 successively acquires positional information with the acquisition unit 514 and sends the acquired positional information to the digital camera 102 in series (Step S705). The smartphone 101 can send the time of acquisition of positional information P together with the positional information P.

Optionally, the smartphone 101 can generate an empty packet that does not include acquired positional information P with the configuration unit 515 and send the empty packet to the digital camera 102 if the acquired positional information P is identical to the previous positional information P or the difference of the acquired positional information P from the previous positional information P is within an acceptable range.

This configuration reduces the amount of transmitted data. The digital camera 102 that has received the empty packet does not store positional information P to the cache memory 200 because there is no positional information P to be stored. As a result, the power consumption in the digital camera 102 can be saved.

If the determination at Step S703 is that the positional information setting mode is OFF (Step S703: OFF), the smartphone 101 sets cancellation data for canceling the already sent positional information P with the configuration unit 515 (Step S706) and sends the cancellation data to the digital camera 102 (Step S707).

If the smartphone 101 receives an advertisement packet sent at Step S603 (Step S701: Yes) but has not determined to be a master (Step S702: No), connection with the digital camera 102 is not established. In this case, the smartphone 101 returns to Step S701.

If the smartphone 101 does not receive an advertisement packet sent at Step S603 (Step S701: No), the smartphone 101 is located outside the communication range of the advertisement packet of the digital camera 102. In this case, the smartphone 101 disables changing the positional information setting mode (Step S708) and returns to Step S701.

Specifically, the smartphone 101 displays the positional information setting mode field 112 (including the slider 113) in an inoperative state for the user or does not display the slider 113. As a result, the smartphone 101 rejects accepting the user's intension whether to set positional information P. Particularly displaying an inoperative state enables the user to see whether the positional information setting mode is currently ON or OFF.

Example of Data Processing by Digital Camera 102

Figure 8:
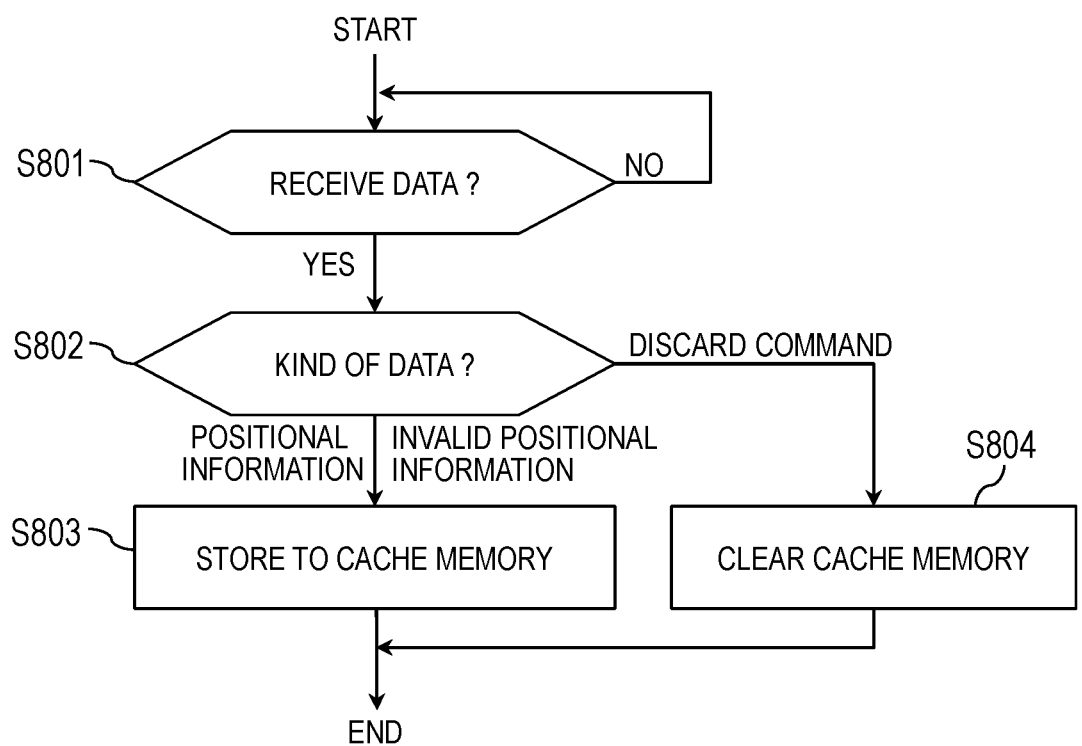
FIG. 8 is a flowchart of an example of data processing by the digital camera at Step S612 in FIG. 6.

FIG. 8 is a flowchart of an example of data processing by the digital camera 102 at Step S612 in FIG. 6. The flowchart of FIG. 8 is an example of processing of firmware to be executed by the processor 401 of the digital camera 102. The digital camera 102 waits for data (positional information P or cancellation data) sent from the smartphone 101 at Step 611 (Step S801: No).

Upon receipt of such data (Step S801: Yes), the digital camera 102 identifies the kind of the received data (Step S802). If the received data is positional information P or invalid positional information PX (Step S802: positional information or invalid positional information), the digital camera 102 stores the received data (positional information P or invalid positional information PX) to the top of the stack in the cache memory 200 as illustrated in the example (A) or (B2) in FIG. 2 (Step S803) and terminates the data processing of Step S612.

In the case where the received data includes the time of acquisition, the digital camera 102 stores the time of acquisition to the cache memory 200 together with the positional information P or invalid positional information PX. As a result, the digital camera 102 can manage the positional information P in association with the time of acquisition.

In the case where the received data does not include the time of acquisition, the digital camera 102 may store the time of reception of the data to the cache memory 200, in place of the time of acquisition. This configuration reduces the amount of data transferred from the smartphone 101 to the digital camera 102.

If the received data is a command to discard positional information P (Step S802: discard command), the digital camera 102 clears the cache memory 200 as illustrated in the example (B1) in FIG. 2 (Step S804) and terminates the data processing of Step S612.

Example of Generating Image File by Digital Camera 102

Figure 9:
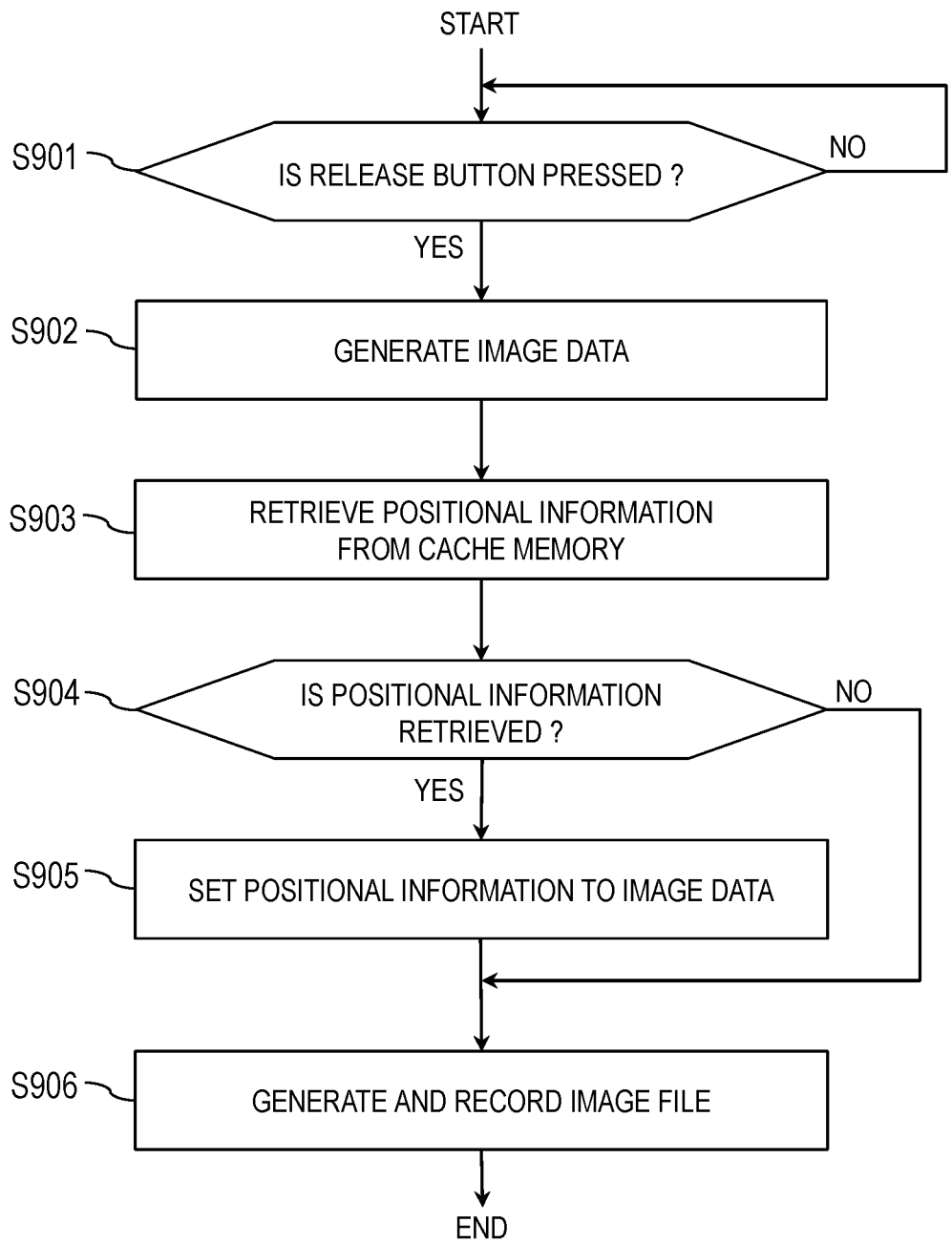
FIG. 9 is a flowchart of an example of generating an image file by the digital camera.

FIG. 9 is a flowchart of an example of generating an image file by the digital camera 102. The digital camera 102 retrieves positional information P without noting whether the positional information stored in the cache memory 200 is information on an actually existing location or invalid positional information PX. Accordingly, the "positional information" shown in FIG. 9 includes positional information P on an actually existing location and invalid positional information PX.

The digital camera 102 waits for the release button to be pressed manually or by a self-timer (Step S901: No). Upon detection of press of the release button (Step S901: Yes), the digital camera 102 takes an image of the object and outputs an image signal with the imager 420, and generates image data 121 with the LSI 407 (Step S902). The digital camera 102 further tries to retrieve the latest positional information P from the cache memory 200 (Step S903).

If positional information P is retrieved (Step S904: Yes), the digital camera 102 sets the positional information P to the image data 121 (Step S905) to generate an image file 122 as illustrated in the example (A) in FIG. 1 and records the image file 122 to the storage device 402 (Step S906).

If positional information P is not retrieved (Step S904: No), or the cache memory 200 is empty as illustrated in the example (B1) in FIG. 2, the digital camera 102 generates an image file 123 that does not include positional information P as illustrated in the example (B) in FIG. 1, and records the image file 123 to the storage device 402 (Step S906).

Examples of Updating Cache Memory 200

Figure 10:
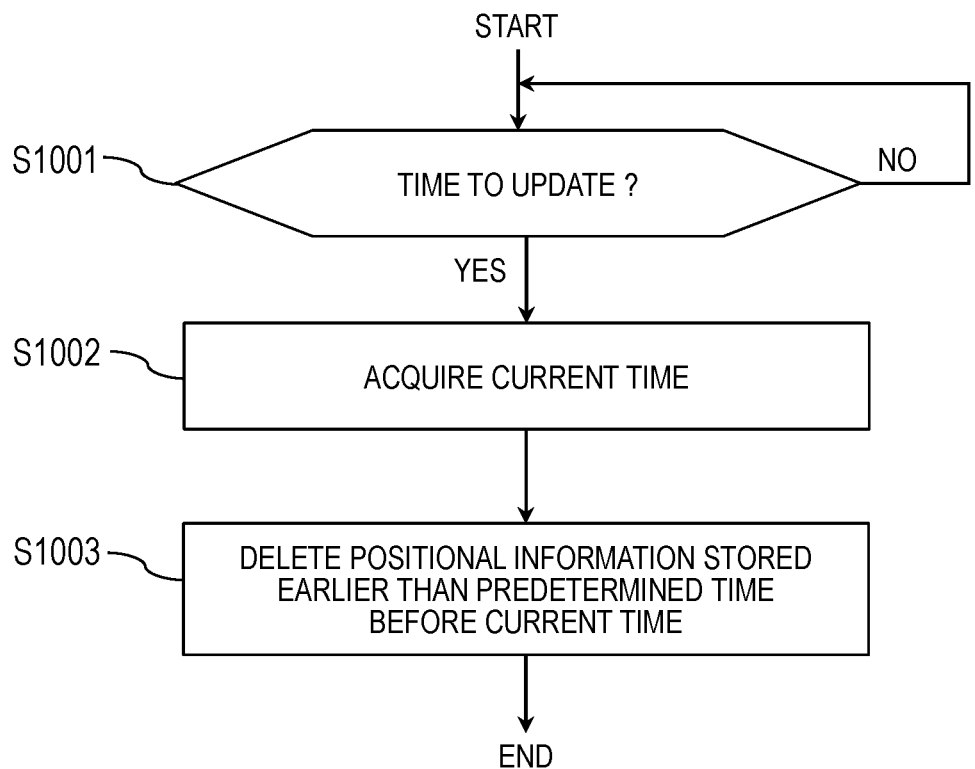
FIG. 10 is a flowchart of Example 1 of updating the cache memory.

FIG. 10 is a flowchart of Example 1 of updating the cache memory 200. First, the digital camera 102 waits for the time to update the cache memory 200 (Step S1001: No). The time to update is a time scheduled in a cycle or specified in accordance with the user operation. If the time to update has come (Step S1001: Yes), the digital camera 102 acquires the current time from its internal clock (Step S1002).

To correct the current time of the internal clock of the digital camera 102, the digital camera 102 can adjust the internal clock based on the time of acquisition sent from the smartphone 101 together with positional information P so that the current time of the internal clock will be the time of acquisition. As a result, the clock in the digital camera 102 is synchronized with the clock in the smartphone 101.

Upon acquisition of the current time (Step S1002), the digital camera 102 deletes positional information P stored earlier than a predetermined time (for example, two hours as mentioned above) before the current time from the cache memory 200 (Step S1003). As a result, positional information P that has not been in the cache memory 200 for the predetermined time since the time of acquisition of the latest positional information P is kept in the cache memory 200.

Figure 11:
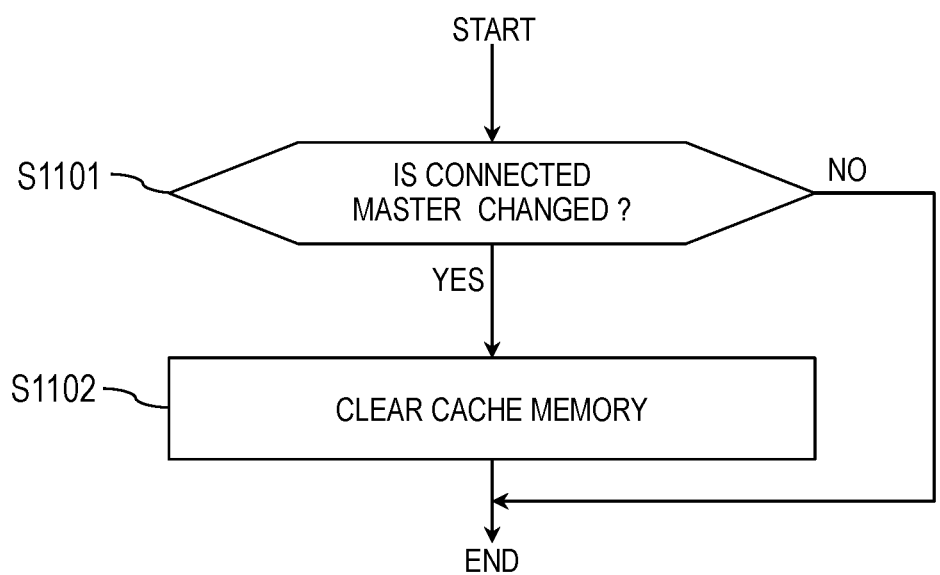
FIG. 11 is a flowchart of Example 2 of updating the cache memory.

FIG. 11 is a flowchart of Example 2 of updating the cache memory 200. The flowchart of FIG. 11 is triggered by establishment of BLE connection between the digital camera 102 and the smartphone 101 in FIG. 6. The digital camera 102 determines whether the connected smartphone 101 is changed (Step S1101). If the smartphone 101 is not changed (Step S1101: No), the digital camera 102 terminates the updating. If the smartphone 101 is changed (Step S1101: Yes), the digital camera 102 clears the cache memory 200 (Step S1102).

After the connected smartphone 101 is changed, the digital camera 102 does not need the positional information P of the smartphone 101 connected before the change. Accordingly, the digital camera 102 deletes all positional information P even before the aforementioned time elapses. However, if the connected smartphone 101 is not changed, the communication could be temporarily disconnected and reconnected because the user once leaves the digital camera 102 while carrying the smartphone 101 and then returns to the digital camera 102. Accordingly, the digital camera 102 does not clear the cache memory 200 like the operation at Step S1102 but updates the cache memory 200 like the operation in FIG. 10.

As described above, Embodiment 1 enables image data 121 of an object generated by a digital camera 102 that has neither a function to choose whether to set positional information P nor a positioning function to be provided with positional information P at the time when the image is taken in accordance with a positional information setting mode (ON or OFF) in the smartphone 101. Not installing the function to choose whether to set positional information P in the digital camera 102 but managing the function with the positional information setting mode of the smartphone 101 eliminates complicated operations on both the smartphone 101 and the digital camera 102 and improves the usability. Furthermore, even if the digital camera 102 does not have a positioning function to acquire positional information P, the digital camera 102 can acquire the positional information P at the time of taking an image from the smartphone 101; the digital camera 102 can be reduced in weight, size, and cost.

Embodiment 2

Embodiment 2 is an example where the digital camera 102 deletes positional information P from an image file 122 retroactively. To mainly explain retroactively deleting positional information P, the elements common to Embodiment 1 are denoted by the same reference signs and description thereof is omitted in Embodiment 2.

Figure 12:
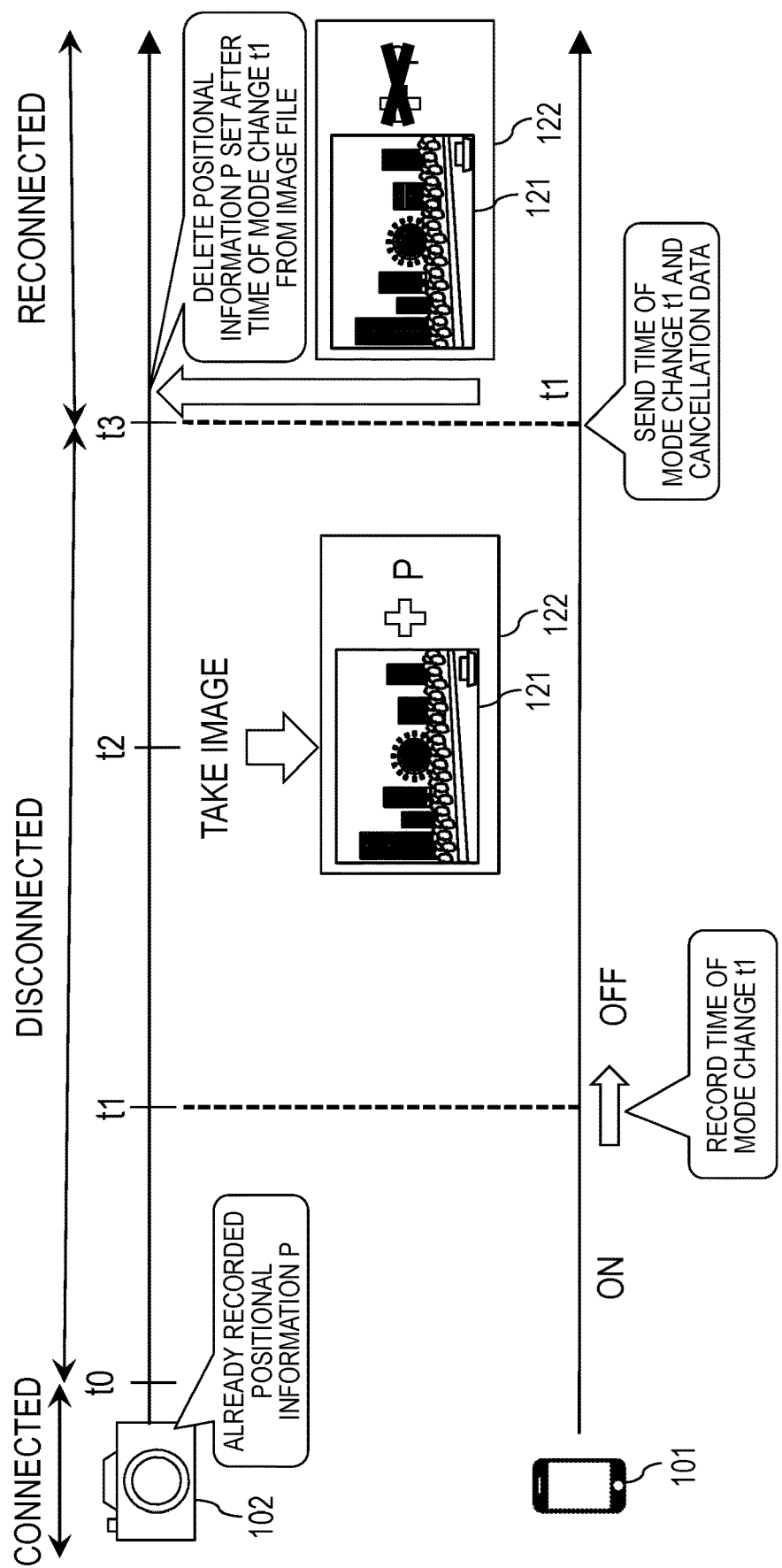
FIG. 12 is an explanatory diagram illustrating an example of retroactively deleting positional information.

FIG. 12 is an explanatory diagram illustrating an example of retroactively deleting positional information P. The digital camera 102 and the smartphone 101 are connected by BLE and the positional information setting mode of the smartphone 101 is ON. Hence, the digital camera 102 acquires the latest positional information P immediately before the time t0. The communication between the digital camera 102 and the smartphone 101 is disconnected at a time t0 because of communication failure or the smartphone 101 exiting the communication range.

After the time t0, the latest positional information in the cache memory 200 of the digital camera 102 is P. The digital camera 102 restarts broadcasting an advertisement packet at the time t0. The digital camera 102 reads the cache memory 200 every time image data 121 is generated no matter whether the positional information setting mode of the smartphone 101 is ON or OFF after the time t0, even if the communication is disconnected.

At a time t1, the positional information setting mode of the smartphone 101 is changed from ON to OFF. The smartphone 101 records the time t1 to the storage device 302 as a time of mode change. At a time t2, the digital camera 102 takes an image of an object and sets the latest positional information P in the cache memory 200 to the image data to generate an image file 122.

At a time t3, BLE connection between the digital camera 102 and the smartphone 101 is established. The smartphone 101 immediately sends the time t1 of the time of mode change to the digital camera 102. Since the positional information setting mode is OFF, the smartphone 101 also sends cancellation data to the digital camera 102.

Upon receipt of the time of mode change t1, the digital camera 102 deletes the positional information P set later than the time of mode change t1 from the image file generated during the disconnection. The position of the digital camera 102 at the time t2 is not necessarily the position indicated by the positional information P. However, the digital camera 102 cannot receive information from the smartphone 101 during the disconnection.

Accordingly, the digital camera 102 retroactively deletes the positional information P. As a result of this operation, erroneous setting of the positional information P can be avoided. Further, the digital camera 102 receives cancellation data at the time t3. Hence, the positional information P will be never set to image data 121 generated by taking an image after the time t3.

Example of Sending Time of Mode Change

Figure 13:
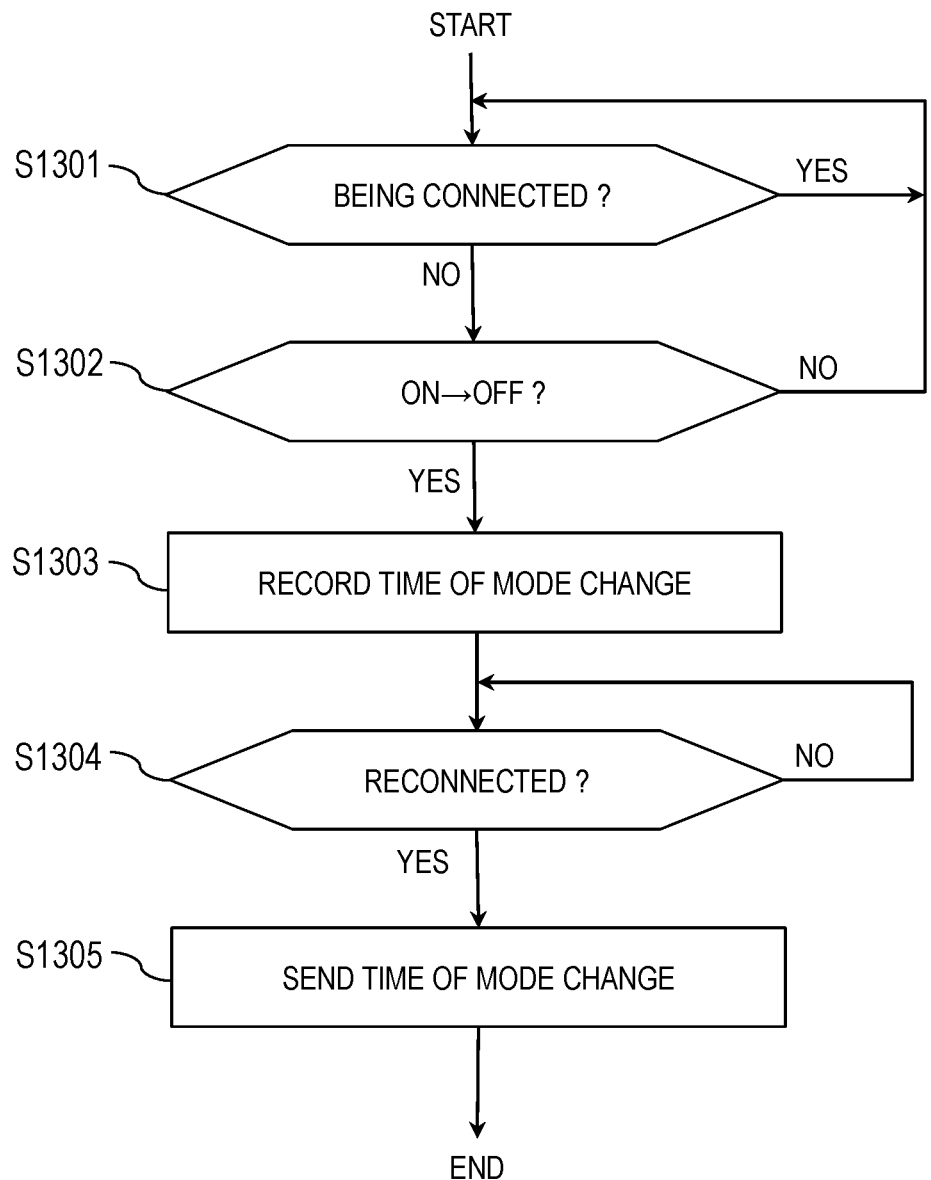
FIG. 13 is a flowchart of an example of sending a time of mode change by the smartphone.

FIG. 13 is a flowchart of an example of sending a time of mode change by the smartphone 101. The flowchart of FIG. 13 is an example of the processing of an application program to be executed by the processor 301 when the positional information setting mode is checked at Step S610 in FIG. 6.

The smartphone 101 determines whether the smartphone 101 is being connected with the digital camera 102 by BLE (Step S1301). If the smartphone 101 is being connected by BLE (Step S1301: Yes), the smartphone 101 returns to Step S1301 to repeat the determination. If the smartphone 101 is not being connected by BLE (Step S1301: No), the BLE connection between the smartphone 101 and the digital camera 102 is disconnected.

Subsequently, the smartphone 101 determines whether the positional information setting mode is changed from ON to OFF (Step S1302). If it is not changed (Step S1302: No), the smartphone 101 returns to Step S1301. If it is changed (Step S1302: Yes), the smartphone 101 records the time of mode change to the storage device 302 (Step S1303).

The smartphone 101 waits to be reconnected with the digital camera 102 after recording the time of mode change (Step S1304: No). If the connection is reestablished (Step S1304: Yes), the smartphone 101 retrieves the time of mode change from the storage device 302 and sends it to the digital camera 102 (Step S1305).

Example of Retroactively Deleting Positional Information

Figure 14:
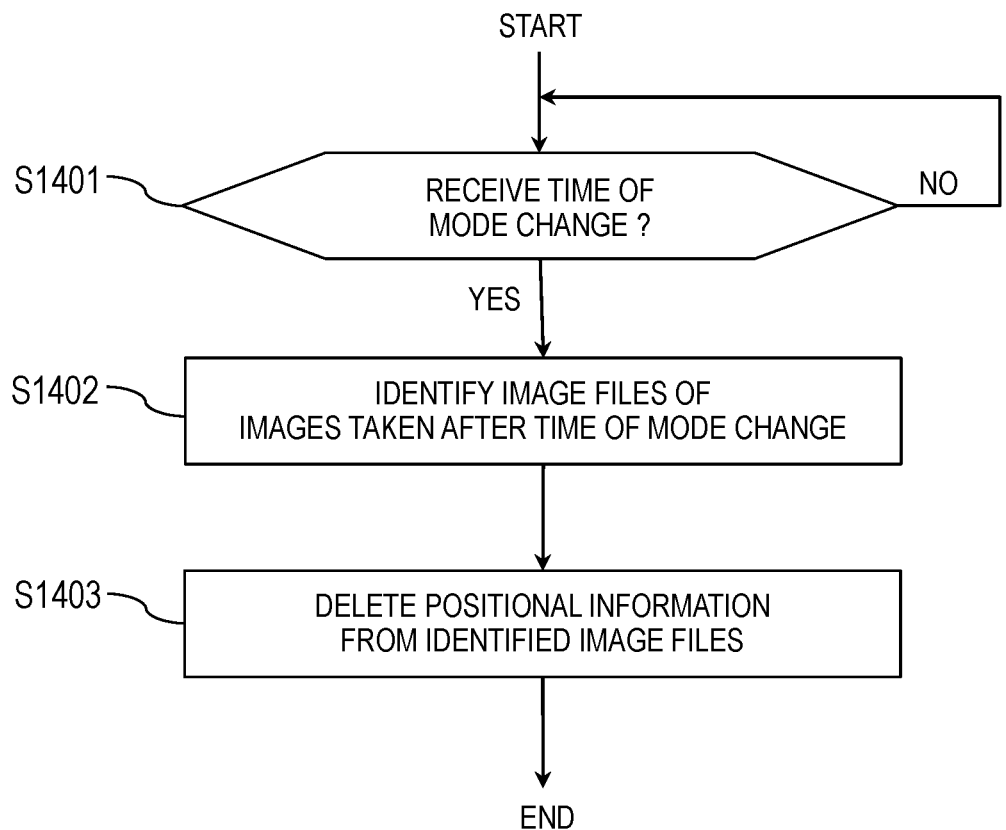
FIG. 14 is a flowchart of an example of retroactively deleting positional information by the digital camera.

FIG. 14 is a flowchart of an example of retroactively deleting positional information by the digital camera 102. The digital camera 102 waits to receive a time of mode change when being reconnected with the smartphone 101 (Step S1401: No). Upon receipt of a time of mode change (Step S1401: Yes), the digital camera 102 searches the storage device 402 to identify image files 122 of the images taken after the time of mode change (Step S1402). Then, the digital camera 102 deletes positional information P from the identified image files 122 (Step S1403) and terminates the retroactively deleting positional information.

Since the digital camera 102 has neither a function to set positional information P nor a positioning function, it cannot stop setting positional information P when the communication with the smartphone 101 is disconnected and therefore, reads the positional information P before the disconnection. However, the digital camera 102 in Embodiment 2 receives the time of mode change after being reconnected to find out the time at which the positional information setting mode in the smartphone 101 is changed from ON to OFF during the disconnection. Accordingly, even if positional information P received before the disconnection is set to image data 121 generated during the disconnection, the digital camera 102 can delete the positional information P later. This operation reduces the frequency to set erroneous positional information P.

Like the digital camera in Embodiment 1, the digital camera 102 in Embodiment 2 has neither a function to choose whether to set positional information P or a positioning function. Accordingly, not installing the function to choose whether to set positional information P in the digital camera 102 but managing the function with the positional information setting mode of the smartphone 101 eliminates complicated operations on both the smartphone 101 and the digital camera 102 and improves the usability. Furthermore, even if the digital camera 102 does not have a positioning function to acquire positional information P, the digital camera 102 can acquire the positional information P at the time of taking an image from the smartphone 101; the digital camera 102 can be reduced in weight, size, and cost.

Embodiment 3

Embodiment 3 provides an example of setting positional information in the case where the digital camera 102 changes the connection with the smartphone 101 from BLE connection to ad hoc Wi-Fi connection to transfer an image file 122 or 123 to the smartphone 101. Embodiment 3 employs BLE as an example of a first communication method for sending positional information P and ad hoc Wi-Fi connection as an example of a second communication method for transferring an image file 122 or 123; however, the first communication method can be any other communication method such as Bluetooth as far as it is slower than the second communication method. In similar, the second communication method can be any other communication method such as Wi-Fi Direct™ ("™" will be omitted hereinafter), as far as the second communication method is faster than the first communication method. To mainly explain this example of setting positional information, the elements same as those in Embodiment 1 or 2 are denoted by the same reference signs and description thereof is omitted in Embodiment 3.

Sequence of Setting Positional Information

Figure 15:
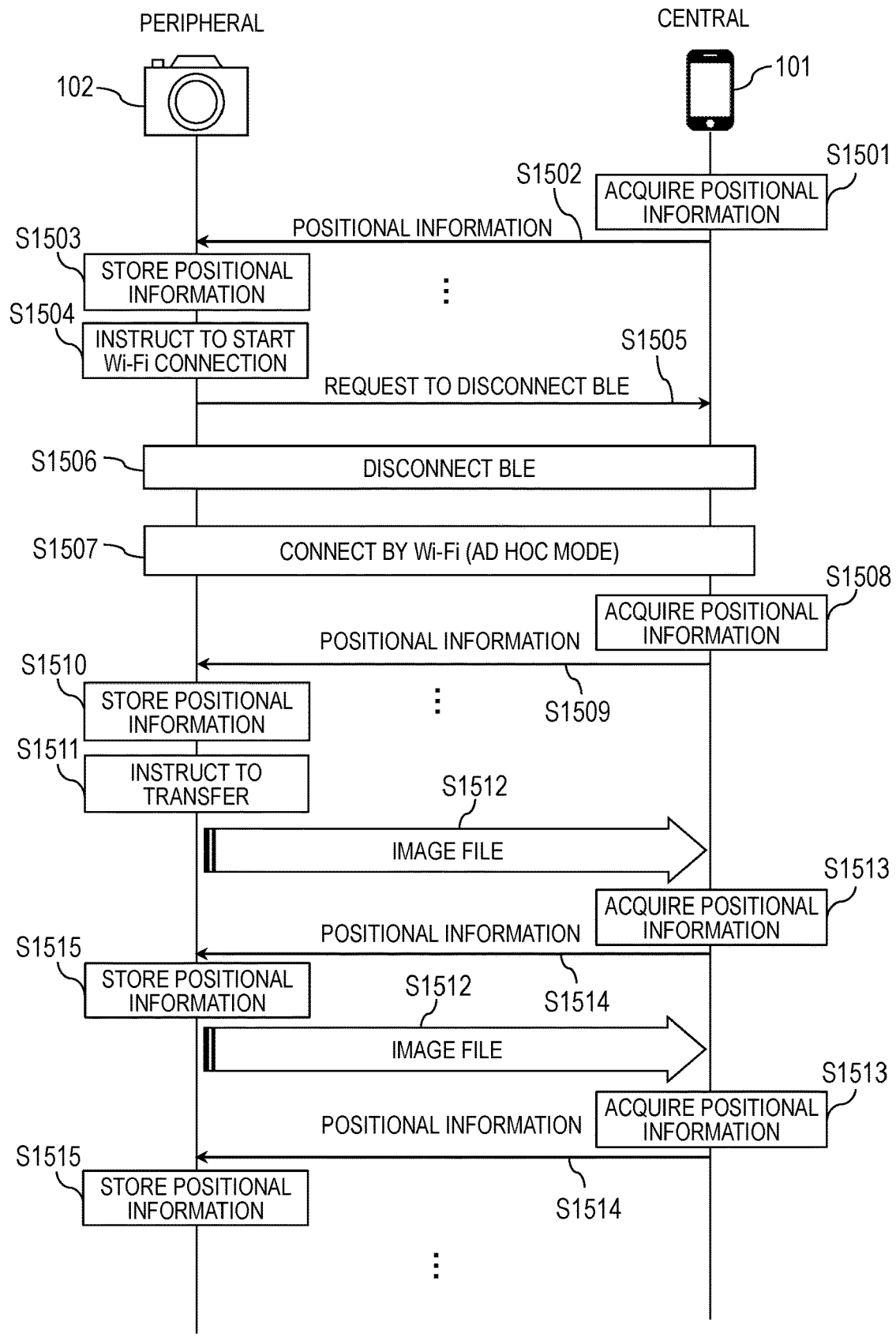
FIG. 15 is a sequence diagram illustrating an example of setting positional information in Embodiment 3.

FIG. 15 is a sequence diagram illustrating an example of setting positional information in Embodiment 3. In the beginning of FIG. 15, the digital camera 102 and the smartphone 101 are already connected by BLE and the positional information setting mode of the smartphone 101 is ON. Each time the smartphone 101 acquires positional information with the acquisition unit 514 (Step S1501), the smartphone 101 transfers the acquired positional information to the digital camera 102 by BLE communication (Step S1502).

Each time positional information P is transferred (Step S1502), the digital camera 102 stores it to the top of the stack in the cache memory 200 (Step S1503). Subsequently, the digital camera 102 receives an instruction to start ad hoc Wi-Fi connection (Step S1504). This instruction to start ad hoc Wi-Fi connection (Step S1504) can be received through explicit operation by the user, for example.

The digital camera 102 may also receive an instruction to start Wi-Fi connection (Step S1504) that is triggered by completion of generation of an image file 122 as a result of taking an image of an object. The digital camera 102 may display a screen to recommend ad hoc Wi-Fi connection on the backside monitor upon completion of generation of an image file 122 as a result of taking an image of an object to receive an instruction to start Wi-Fi connection (Step S1504) through explicit operation by the user.

Upon receipt of the instruction to start Wi-Fi connection (Step S1504), the digital camera 102 sends a request to disconnect BLE (a TERMINATE packet) to the smartphone 101 (Step S1505). With this operation, the smartphone 101 and the digital camera 102 disconnect the BLE connection (Step S1506). Such disconnecting the BLE connection before starting ad hoc Wi-Fi connection reduces the wasteful power consumption of the smartphone 101 and the digital camera 102.

Subsequently, the smartphone 101 and the digital camera 102 establish ad hoc Wi-Fi connection (Step S1507).

After establishment of ad hoc Wi-Fi connection (Step S1507), the smartphone 101 acquires positional information with the acquisition unit (Step S1508) and each time, the smartphone 101 transfers the positional information to the digital camera 102 through the ad hoc Wi-Fi connection (Step S1509). Each time positional information P is transferred (Step S1509), the digital camera 102 stores the positional information P to the top of the stack in the cache memory 200 (Step S1510).

Subsequently, the digital camera 102 receives an instruction to transfer image files by ad hoc Wi-Fi connection (Step S1511). Specifically, the digital camera 102 may receive the instruction to transfer image files with designation of the image files 122 to be transferred through user operation. This transfer instruction (Step S1511) can be received through explicit operation by the user.

The digital camera 102 may also receive a transfer instruction (Step S1511) triggered by accumulation of image files 122 exceeding a predetermined volume in the storage device 402. When the image files 122 accumulated in the storage device 402 exceed a predetermined volume, the digital camera 102 can display a screen to recommend transfer of files by ad hoc Wi-Fi connection and receive designation of the image files 122 to be transferred on the backside monitor to receive designation of the image files 122 to be transferred and a transfer instruction (Step S1511) through explicit operation by the user.

Upon receipt of the transfer instruction (Step S1511), the digital camera 102 transfers an image file 122 (Step S1512). Upon completion of the transfer of the image file 122 (Step S1512), the smartphone 101 acquires positional information P with the acquisition unit 514 (Step S1513) and transfers the acquired positional information P to the digital camera 102 through ad hoc Wi-Fi connection (Step S1514).

Each time positional information P is transferred (Step S1514), the digital camera 102 stores the positional information P to the cache memory 200 (Step S1515). Upon completion of transfer of positional information P (Step S1514), the digital camera 102 transfers the next image file 122 to the smartphone 101 through ad hoc Wi-Fi connection (Step S1512).

The smartphone 101 and the digital camera 102 repeat transfer of an image file 122 in units of file at Steps S1512 to S1515; however, the file transfer can be performed in units of certain size, instead of in units of file. In the case of transfer in units of file, image files 122 have different sizes and therefore, the intervals for the smartphone 101 to transfer positional information P are varied. However, in the case of transfer in units of certain size, the variation among the transfer intervals can be reduced. Further in the case of transfer in units of certain size, the frequency for the smartphone 101 to transfer positional information P can be increased by determining a smaller size for a unit.

When a user riding on a moving object such as a car or a train takes images with the digital camera 102 and transfers their image files 122 from the digital camera 102 to the smartphone 101, the digital camera cannot acquire positional information P until transfer of an image file 122 is completed and therefore, the last stored positional information P could be different from the current position. For this reason, the digital camera 102 may suspend transferring image files 122 in ad hoc Wi-Fi connection (Step S1512) if the speed of the moving object is higher than a predetermined speed.

Specifically, the smartphone 101 calculates the speed of the moving object based on the successively acquired positional information P and the time intervals of the acquisition. The smartphone 101 transfers the calculated speed together with or instead of positional information P to the digital camera 102 through ad hoc Wi-Fi connection (Step S1514).

Upon being notified of the movement speed, the digital camera 102 suspends transferring image files if the speed is higher than a predetermined speed. As a result of this operation, the smartphone 101 can transfer positional information P to the digital camera 102 through ad hoc Wi-Fi connection without waiting for completion of transfer of an image file. In this case, the digital camera 102 resumes the transfer of image files 122 when the received movement speed becomes lower than the predetermined speed.

Instead of sending the speed of the moving object to the digital camera 102, the smartphone 101 can send an instruction to suspend transfer of image files together with or instead of positional information P to the digital camera 102 through ad hoc Wi-Fi connection, if the speed of the moving object is higher than a predetermined speed (Step S1514).

In this case, the digital camera 102 that receives the instruction to suspend transfer of image files 122 suspends transfer of image files 122. As a result, the smartphone 101 can transfer positional information P to the digital camera 102 through ad hoc Wi-Fi connection without waiting for completion of transfer of an image file 122.

The smartphone 101 sends an instruction to resume transfer of image files 122 to the digital camera 102 when the calculated movement speed becomes lower than the predetermined speed. The digital camera 102 resumes the transfer of the image file 122 upon receipt of the instruction to resume transfer.

Although the above-described two examples of transfer control control suspension and resumption of transfer of image files 122, the control may decrease the unit size as the movement speed becomes higher.

Specifically, the smartphone 101 calculates the speed of a moving object based on the successively acquired positional information P and the time intervals in acquiring positional information P. The smartphone 101 transfers the calculated movement speed together with or instead of positional information P to the digital camera 102 through ad hoc Wi-Fi connection (Step S1514).

In these cases, the digital camera 102 decreases the unit size if the received movement speed is higher than the previous one, and increases the unit size if the received movement speed is lower than the previous one. This configuration enables the smartphone 101 to control the frequency of transferring positional information P depending on the speed of the moving object.

Instead of sending the speed of the moving object to the digital camera 102, the smartphone 101 can send an instruction to decrease the unit size if the calculated speed is higher than the previous one and an instruction to increase the unit size if the calculated speed is lower than the previous one together with or instead of positional information P to the digital camera 102 through ad hoc Wi-Fi connection (Step S1514).

In these cases, the digital camera 102 that receives an instruction to decrease the unit size decreases the unit size and transfers image files to the smartphone 101 through ad hoc Wi-Fi connection in units of the decreased size and the digital camera 102 that receives an instruction to increase the unit size increases the unit size and transfers image files to the smartphone 101 through ad hoc Wi-Fi connection in units of the increased size. This configuration enables the smartphone 101 to control the frequency of transferring positional information P depending on the speed of transportation.

The foregoing description has explained assuming that the positional information setting mode of the smartphone 101 is ON. If the positional information setting mode is changed from ON to OFF, the smartphone 101 sends the digital camera 102 cancellation data, instead of positional information P (Steps S1502, S1508, and S1513).

In this case, if the cancellation data is a command to discard positional information P, the digital camera 102 discards the positional information P in the cache memory 200 as illustrated in the example (B1) in FIG. 2, like in Embodiment 1. Accordingly, the image files 123 to be transferred do not include positional information P as illustrated in the example (B) in FIG. 1.

If the cancellation data is invalid positional information PX, the digital camera 102 stacks invalid positional information PX to the cache memory 200 as illustrated in the example (B2) in FIG. 2. Accordingly, the image files 123 to be transferred include invalid positional information PX as illustrated in the example (B) in FIG. 1.

As understood from the above, Embodiment 3 enables the smartphone 101 to transfer positional information P or cancellation data to the digital camera 102 through ad hoc Wi-Fi connection in the intervals of transferring image files from the digital camera 102 to the smartphone 101 through ad hoc Wi-Fi connection. Accordingly, BLE connection that is not used to transfer positional information P or cancellation data is disconnected to reduce the wasteful power consumption in the smartphone 101 and the digital camera 102.

The above-described Embodiments 1 to 3 have described examples where the smartphone 101 sends cancellation data to the digital camera 102. However, the smartphone 101 can send a command not to set positional information P to data (hereinafter, a non-setting command) to the digital camera 102. Upon receipt of the non-setting command, the digital camera 102 performs either one of two kinds of data processing.

One kind of data processing is that the digital camera 102 regards the non-setting command as the aforementioned command to discard positional information P and clears the cache memory 200 as illustrated in the example (B) in FIG. 2.

The other kind of data processing is that the digital camera 102 does not regard the non-setting command as a command to discard positional information P and does not set the latest positional information Pn (as of the time Tn) to the image data 121. In other words, after receiving a non-setting command, the digital camera 102 stops retrieving the latest positional information Pn (as of the time Tn) from the cache memory 200. This configuration reduces the load to retrieve positional information P.

When the mode of the smartphone 101 is subsequently changed from the second mode (the positional information setting mode: OFF) to the first mode (the positional information setting mode: ON), the digital camera 102 receives positional information P from the smartphone 101. Upon receipt of the new positional information P, the digital camera 102 cancels the stop of retrieval of positional information Pn from the cache memory 200. As understood from the above, the digital camera 102 stops retrieving positional information P from the cache memory 200 when the smartphone 101 is in the second mode (the positional information setting mode: OFF) to reduce the processing load and wasteful power consumption.

It should be noted that this invention is not limited to the configurations described above but can be achieved by desirably combining these configurations. This invention also includes other possible aspects within the technical scope of this invention.

EXPLANATION OF REFERENCES

101 smartphone, 102 digital camera, 121 image data, 122, 123 image file, 200 cache memory, 420 imager, 511 first sender unit, 512 first receiver unit, 513 first storage unit, 514 acquisition unit, 515 configuration unit, 521 second receiver unit, 522 second storage unit, 523 second sender unit, 524 generator unit, 525 control unit

What is claimed is:

1. An electronic device configured to send positional information to an external device configured to set the positional information to data, the electronic device comprising:
an acquisition unit configured to acquire positional information;
a sender unit configured to send information to the external device; and
a configuration unit configured to choose a first mode to allow the external device to set positional information to data or a second mode not to allow the external device to set positional information to data,
wherein the configuration unit is configured to disable user operation to choose the first mode or the second mode in a case where sending information to the external device is not available for the sender unit.

2. The electronic device according to claim 1, wherein the sender unit is configured to send the external device positional information together with a time of acquisition at which the acquisition unit acquires the positional information.

3. The electronic device according to claim 1, wherein the configuration unit is configured to choose the second mode in a case where sending information to the external device is not available for the sender unit.

4. The electronic device according to claim 1, wherein the acquisition unit is configured to acquire the positional information and the sender unit is configured to send the external device the positional information acquired by the acquisition unit in a case where the second mode is changed to the first mode.

5. The electronic device according to claim 1, wherein the sender unit is configured to send the external device a command not to set to data positional information received from the electronic device or invalid positional information, in a case where the electronic device is in the second mode not allowing the external device to set positional information to data.

6. The electronic device according to claim 5, wherein the sender unit is configured to send the external device a command to discard positional information received from the electronic device as the command not to set to data positional information received from the electronic device.

7. An electronic device configured to send positional information to an external device configured to set the positional information to data, the electronic device comprising:
an acquisition unit configured to acquire positional information;
a sender unit configured to send information to the external device; and
a configuration unit configured to choose a first mode to allow the external device to set positional information to data or a second mode not to allow the external device to set positional information to data,
wherein the sender unit is configured to send the external device a time of change at which the first mode is changed to the second mode under a situation where sending information to the external device is not available for the sender unit together with a command not to set positional information received from the electronic device to data after sending information to the external device becomes available for the sender unit.

8. An electronic device comprising:
a generator unit configured to generate data;
a receiver unit configured to receive information from an external device;
a storage unit configured to store positional information sent by the external device and received by the receiver unit; and
a control unit configured to set to data positional information generated by the generator unit,
wherein the receiver unit is configured to receive a time of change at which a mode not to set positional information to data is chosen together with a command not to set positional information to data, and
wherein the control unit is configured to delete positional information set to data after the time of change from the data to which the positional information is set.

9. The electronic device according to claim 8, wherein the control unit is configured to discard positional information stored in the storage unit in a case where the receiver unit receives a command to discard positional information.

10. The electronic device according to claim 8, wherein the control unit is configured to set positional information stored in the storage unit to data generated by the generator unit upon generation of the data.

11. The electronic device according to claim 8, wherein the control unit is configured not to set positional information stored in the storage unit to data in a case where the receiver unit does not receive positional information for a predetermined time.

12. The electronic device according to claim 8,
wherein the receiver unit is configured to receive a time of acquisition of positional information at the external device together with the positional information from the external device, and
wherein the control unit is configured not to set positional information stored in the storage unit to data in a case where a predetermined time has elapsed since the time of acquisition of the positional information.

13. The electronic device according to claim 8, wherein the control unit is configured not to set positional information stored in the storage unit to data in a case where receiving information from the external device is not available for the receiver unit.

14. The electronic device according to claim 8,
wherein the generator unit is an imager configured to take an image of an object to generate image data, and
wherein the control unit is configured to set positional information to image data.

15. The electronic device according to claim 8,
wherein the control unit is configured not to set positional information stored in the storage unit to data in a case where the receiver unit receives invalid positional information from the external device.

16. The electronic device according to claim 8, wherein the control unit is configured not to set positional information stored in the storage unit to data in a case where the receiver unit receives a command not to set positional information to data.

17. A non-transitory computer-readable medium storing a computer program configured to make a processor of an electronic device configured to send positional information to an external device configured to set positional information to data perform the processing of:
acquiring positional information;

choosing a first mode to allow the external device to set positional information to data or a second mode not to allow the external device to set positional information to data; and disabling user operation to choose the first mode or the second mode in a case where sending information to the external device is not available.

18. The non-transitory computer-readable medium according to claim 17, wherein the processing of choosing includes choosing the second mode in a case where sending information to the external device is not available in the processing of sending.

19. The non-transitory computer-readable medium according to claim 17, wherein the computer program is configured to make the processor to perform the processing of acquiring in a case where the second mode is changed to the first mode, and wherein the processing of sending includes sending the electronic device positional information acquired by the processing of acquiring.

20. The non-transitory computer-readable medium according to claim 17, wherein the computer program is configured to make the processor perform the processing of sending the external device a command not to set to data positional information received from the electronic device or invalid positional information, in a case where the electronic device is in the second mode not allowing the external device to set positional information to data.

21. The non-transitory computer-readable medium according to claim 20, wherein the processing of sending includes sending the external device a command to discard positional information received from the electronic device as the command not to set the positional information received from the electronic device to data.

22. The non-transitory computer-readable medium according to claim 20, wherein the processing of sending includes sending the external device positional information together with a time of acquisition at which the positional information is acquired in the processing of acquiring.

23. A non-transitory computer-readable medium storing a computer program configured to make a processor of an electronic device configured to send positional information to an external device configured to set positional information to data perform the processing of:

acquiring positional information; and sending the external device a time of change at which a first mode is changed to a second mode under a situation where sending information to the external device is not available in the processing of sending together with a command not to set positional information received from the electronic device to data after sending information to the external device becomes available.

* * * * *